United States Patent
Goldberg

(10) Patent No.: US 11,323,756 B2
(45) Date of Patent: *May 3, 2022

(54) ANNOTATING EXTENDED REALITY PRESENTATIONS

(71) Applicant: VERIZON PATENT AND LICENSING INC., Basking Ridge, NJ (US)

(72) Inventor: Lawrence Roy Goldberg, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,525

(22) Filed: Nov. 9, 2020

(65) Prior Publication Data

US 2021/0058649 A1 Feb. 25, 2021

Related U.S. Application Data

(63) Continuation of application No. 16/233,194, filed on Dec. 27, 2018, now Pat. No. 10,834,445.

(51) Int. Cl.
*H04N 21/235* (2011.01)
*H04N 21/2343* (2011.01)
*H04L 29/08* (2006.01)
*G06T 19/00* (2011.01)
*G06F 40/169* (2020.01)
*H04L 67/306* (2022.01)

(52) U.S. Cl.
CPC ......... *H04N 21/235* (2013.01); *G06F 40/169* (2020.01); *G06T 19/006* (2013.01); *H04L 67/306* (2013.01); *H04N 21/2343* (2013.01)

(58) Field of Classification Search
CPC .. H04N 21/235; H04N 21/2343; H04N 21/84; G06F 40/169; G06T 19/006; H04L 67/306
See application file for complete search history.

(56) References Cited

U.S. PATENT DOCUMENTS

| 10,834,445 | B2 * | 11/2020 | Goldberg | H04N 21/25808 |
| 2007/0277092 | A1 * | 11/2007 | Basson | H04N 21/84 725/60 |
| 2008/0094417 | A1 * | 4/2008 | Cohen | A63F 13/52 345/632 |

* cited by examiner

*Primary Examiner* — Jeffery A Brier

(57) ABSTRACT

Extended reality presentations (e.g., augmented reality, augmented virtuality, and virtual reality) are often presented as multimodal experiences involving a combination of visual, audio, and haptic input and output channels. Users who have a deficit in one modality may consume other channels of the extended reality presentation, but the absence of the deficit modality may render the extended reality presentation incomplete or incomprehensible. Instead, for users with a deficit in a source modality, a modality may be identified as an annotation modality in which the user does not have a deficit. An annotation set of annotations in the annotation modality may be generated that respectively describe an event arising in a source channel in the source modality. The annotation set may be presented to the user (either supplementing the source channel or in lieu of the source channel), thereby adapting the extended reality presentation to the physiological capabilities of the user.

20 Claims, 9 Drawing Sheets

ANNOTATING EXTENDED REALITY PRESENTATIONS

CROSS REFERENCE TO RELATED APPLICATION

This application claims priority to and is a continuation of U.S. application Ser. No. 16/233,194, filed on Dec. 27, 2018, entitled "ANNOTATING EXTENDED REALITY PRESENTATIONS", which is incorporated by reference herein in its entirety.

BACKGROUND

Within the field of computing, many scenarios involve an extended reality presentation comprising a combination of real-world elements and digitally presented elements, such as augmented reality, augmented virtuality, and virtual reality presentations. Some extended reality presentations are non-interactive, such as a stream of content that is presented to the user in various modalities, such as audio, video, and haptic stimulation, which the user may passively view from a variable perspective, such as looking around a three-dimensional scene using a headset or a mobile device. Other extended reality presentations are interactive, such as a set of objects or user interface elements that are presented within an environment that the user may navigate, and with which the user may interact to change the presented content.

Devices may feature a variety of input and output mechanisms to provide an extended reality experience. As a first example, with respect to a visual modality, a device may provide an input device comprising a camera that captures a visual view of the user's environment, including a view of the user, and an output device comprising a display that presents a rendering of visual content, including portions of the visual input captured by the camera. As a second example, with respect to an audio modality, a device may provide an input device comprising a microphone that captures sound in the user's environment, such as the user's voice, and an output device comprising speakers that present audio to the user, such as headphones or head-mounted speakers. As a third example, with respect to a haptic modality, a device may provide an input device comprising a touch- and/or orientation-sensitive device, such as a touchscreen, and an output device comprising a motor that generates tactile output. Using these components, a device may utilize a variety of sensory input and output modalities to present a set of rich extended reality experiences.

SUMMARY

The rich set of multimodal input and output that comprise a typical extended reality experience may present some limitations to users who have a deficit in one or more of the involved modalities. As a first example, users with a vision deficit are often unable to participate in extended reality experiences that utilize visual input and output. As a second example, users with a hearing deficit are often unable to participate in extended reality experiences that utilize audial input and output. As a third example, users with a sensory or muscular deficit are often unable to participate in extended reality experiences that utilize haptic input and output. These users may be able to participate in other modalities of an extended reality presentation (e.g., a user with a visual deficit may be able to listen to the audio channel of a presentation); however, significant events within the extended reality experience may only be presented visually, and the presentation in the audio channel may be incomplete, confusing, or in some cases entirely incomprehensible when consumed in isolation of the visual channel.

Presented herein are techniques for adapting a presentation of an extended reality presentation to the capabilities of a user. An extended reality presentation that includes a source channel in a particular source modality, where the source channel includes a set of events. The source channel may be generated and stored before the presentation (e.g., for non-interactive presentations or low-interaction presentations, such as stories with limited selection points) or dynamically generated for presentation (e.g., for high-interaction presentations, such as games with highly dynamic content that respond to the user's actions). For users who have a deficit in the source modality, an annotation modality may be selected that is different than the source modality, such as an audio modality for users who have a visual deficit or a haptic modality for users who have an audio deficit. For events that arise within the source modality, an annotation set of annotations may be generated in the annotation modality that describe the source modality. The annotation set may be presented to the user, either concurrently with (e.g., supplemental of) the source channel or substituting for (e.g., in lieu of) the source channel, thereby adapting the events of the extended reality presentation to the physiological capabilities of the user.

A first embodiment of the presented techniques involves a method of generating an extended reality presentation. The method involves a device having a processor and involves executing, by the processor, instructions that cause the device to receive a source channel of the extended reality presentation in a source modality. Execution of the instructions further causes the device to choose an annotation modality that is different than the source modality. Execution of the instructions further causes the device to generate an annotation set in the annotation modality by identifying a set of events in the source channel and generating, for each event in the source channel, an annotation in the annotation modality that describes the event. Execution of the instructions further causes the device to store the extended reality presentation as the source channel and the annotation set in the annotation modality.

A second embodiment of the presented techniques involves a method of presenting an extended reality presentation to a user. The method involves a device having a processor and involves executing, by the processor, instructions that cause the device to identify a source channel of the extended reality presentation in a source modality. Execution of the instructions further causes the device to determine that the user has a deficit in the source modality. Execution of the instructions further causes the device to identify, in the extended reality presentation, an annotation set of annotations in an annotation modality that describe events in the source channel. Execution of the instructions further causes the device to, while presenting the extended reality presentation to the user, present the annotations of the annotation set in the annotation modality.

A third embodiment of the presented techniques involves a device that presents an extended reality presentation to a user. The device comprises a processor and a memory storing instructions that, when executed by the processor, cause the device to operate in accordance with the techniques presented herein. In one such device, execution of the instructions causes the device to identify a source channel of the extended reality presentation in a source modality. Execution of the instructions further causes the device to determine that the user has a deficit in the source modality.

Execution of the instructions further causes the device to identify, in the extended reality presentation, an annotation set of annotations in an annotation modality that describe events in the source channel. Execution of the instructions further causes the device to, while presenting the extended reality presentation to the user, present the annotations of the annotation set in the annotation modality.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Figure 1:
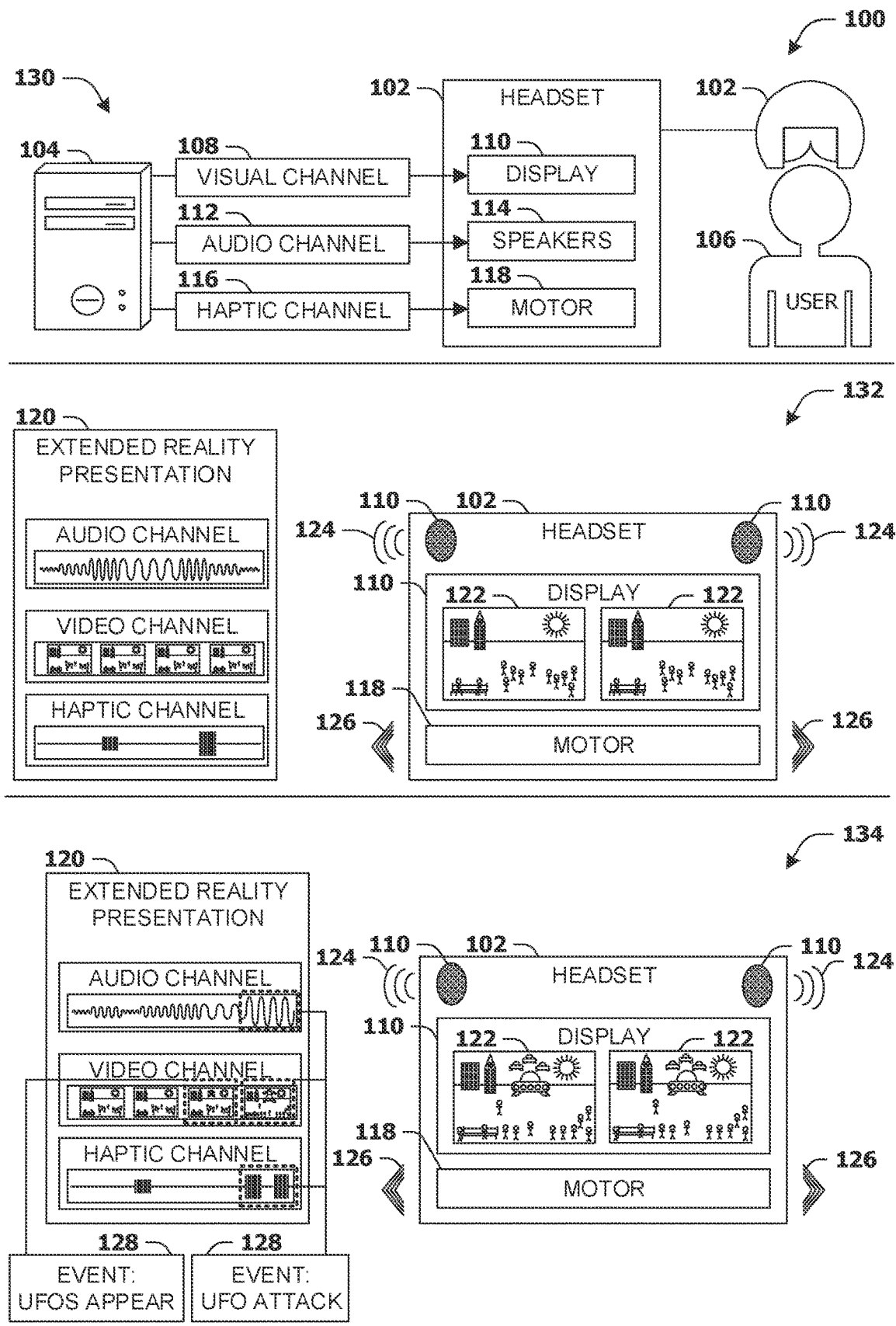
FIG. 1 is an illustration of a scenario involving a multi-modal presentation of an extended reality presentation.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Introduction

The field of computing presently involves a variety of presentation techniques that are collectively referred to as extended reality, in which digital content and real-world content are combined in a variety of ways.

A first extended reality presentation involves augmented reality, in which a presentation of the real world is supplemented with digital content. For example, a mobile device may capture a live view of a user's environment with a camera and a live audio capture with a microphone. The mobile device may concurrently present the view of the real world on a display while also introducing visual elements that supplement or highlight the real-world display, while also playing the real-world audio with digital modifications, such as modulating a voice of the user to a different sound profile. The mobile device may also use haptic input, such as touch- or pressure-sensitive input detected by a haptic input device or an orientation of the mobile device detected by an inertial measurement unit (IMU), and haptic output, such as vibration generated by a motor, which may supplement the augmented-reality experience in presenting a digitally supplemented version of the real-world environment.

A second extended reality presentation involves augmented virtuality, in which a digital environment is joined with aspects of a real-world environment. As a first such example, a virtual environment may be rendered with an avatar representing the user, and a real-world input (e.g., a camera) may capture a real-world object and that is integrated in the visual component of the virtual environment. As a second such example, a device may capture audio from the user's environment, evaluate the sound to identify events occurring in the user's physical environment (e.g., rain or thunder) and blend in sound effects that alter the virtual environment to integrate with the user's physical environment (e.g., music or sound effects that complements the weather effects). As a third such example, a device may capture haptic input from the user (e.g., an orientation of a user's manual manipulation of a handheld device, such as a steering wheel) and provide additional haptic output that complements the haptic input (e.g., vibrational feedback that emphasizes the motion of the steering wheel).

A third extended reality presentation involves virtual reality, involving an immersive presentation of a rendered environment with which the user may physically interact. As a first such example, a device may capture video of a user's bodily movements, perform kinematic analysis, and reproduce such movements in a visual presentation of an avatar. As a second such example, a device may capture and analyze a user's voice to identify spoken words, and may render audio into the virtual environment comprising a spoken response from a virtual companion. As a third such example, a device may detect haptic input, such as a glove that detects the user's hand and finger movements, and detect gestures that manipulate the user's perspective within the virtual environment.

In these and other forms of extended reality, a device may receive input in a combination of modalities (e.g., visual input, audio input, and haptic input) and present output in a combination of modalities (e.g., visual output, audio output, and haptic output). A first device (such as a handheld device or a wearable headset) may receive a set of input signals, such as video captured from a camera, audio captured from a microphone, and haptic input detected by a touch-, pressure-, and/or orientation-sensitive device, and may transmit the input signals to a second device (such as a computer or a server) for application within the extended reality environment. Additionally, the second device may provide a set of one or more source channels, respectively in a modality, and the first device may concurrently present the source channels to the user. The content channels may be synchronized to promote consistency of the output among two or more modalities (e.g., presenting generated verbal output with matching visual facial movements of a digital character, or coordinating audio output of an event with haptic input providing sensory output of the event such as vibration).

In some extended reality presentations, the content may be pregenerated and/or relatively static, such as a virtual-reality movie that a user may passively view by looking around within a headset. In other extended reality presentations, the content may be rendered ad-hoc and/or relatively dynamic, such as a game involving events or objects that respond promptly to a user's movements. The degree of interaction may also vary, such as a low-interaction story that enables the user to choose branches in a narrative arc and a high-interaction experience that reproduces the user's bodily movements with high precision and fidelity to present a digital avatar. The coordination of multi-modality content may serve all such extended reality presentations to provide a richer and more engaging experience.

FIG. 1 is an illustration of an example scenario 100 featuring a presentation of an extended reality presentation 120 to a user 106. The example scenario 100 of FIG. 1 includes a first illustration 130 in which a user 106 wears a headset 102 that presents content generated by a device 104 that includes a set of channels, including a visual channel 108 comprising a set of video frames, an audio channel 112 comprising an audio stream, and a haptic channel 116 comprising a set of haptic signals representing vibration impulses. The headset 102 may incorporate a set of output devices that realize the content provided by the device 104, such as a pair of displays 110 positioned within the headset 102 to provide left- and right-eye visual output to the user 106; speakers 114 embedded within the sides of the headset 102 to provide audio output to the user 106; and a motor 118 that provides haptic input, such as a gentle physical tap, which may present a tactile signal that is distinct from the audio and video output.

In a second illustration 132, an extended reality presentation 120 that depicts a daytime outdoor scene is presented as a set of channels that are respectively rendered by the headset 102 to present the extended reality presentation to the user 106, such as visual output 122 from the displays 110 in the visual channel 108, audio output 124 from the speakers 114 in the audio channel 112, and haptic output 126 from the motor 118 in the haptic channel 116. Each channel may include a stream, which may be pregenerated and simply streamed from the device 104 to the headset 102 or dynamically rendered for presentation by the headset 102.

In a third illustration 134, a set of events 128 may arise within the content of the extended reality presentation 120 that manifest within one or more of the channels. As a first such example, a first event 128 may comprise an appearance of a set of unidentified flying objects in the distant horizon of the daytime outdoor scene. The first event 128 may be significant to the content of the extended reality presentation 120, but may only be reflected in the video channel 108. Subsequently, a second event 128 may be presented that involves an attack by the unidentified flying objects within the outdoor scene, which may be presented as a coordinated set of signals within each channel, such as audio within the audio channel 112, additional video within the video channel 108, and haptic output within the haptic channel 116. Other events may involve other subcombinations of the channels, such as a third event that is only represented in the audio channel 112 (e.g., speech from a character who is not within the field of view). Together, the channels may present a multimodal representation using the multimodal input and output components of the headset 102.

2. Presented Techniques

For many users 106, the multimodal nature of extended reality presentations may convey a set of events 128 that comprise the content of the presentation in a rich, immersive, and dynamic manner. However, other users 106 may not be able to participate in the experience due to a deficit in one or more modalities utilized by the content of the extended reality presentation 120. As a first such example, a user 106 with a visual deficit, such as blindness or poor visual acuity, may have no or limited visibility of the visual channel 108 of the extended reality presentation 120. Additionally, such users 106 may have difficulty providing visual input, such as bodily movement that provides kinematic input, without visual feedback of the results of such movements. As a second such example, a user 106 with a hearing deficit, such as complete or partial deafness, may be unable to receive the audial content of the audio channel 112. Additionally, such users 106 may be unable to provide audio input, such as verbal input that represents the user's portion of a verbal conversation with a character within the extended reality presentation 120. As a third such example, a user 106 with a physiological handicap, such as paralysis or diminished sensory input, may be unable to sense the haptic output of the haptic channel 116. Additionally, such users may have difficulty providing haptic input, such as tapping or manually manipulating an object or altering an orientation of a portable device.

For such users 106, portions of the extended reality presentation 120 may be omitted or inaccessible, e.g., where events 128 are presented in a particular modality in which the user 106 has a deficit. In many such cases, the extended reality presentation 120 experienced by the user 106 is partially incomplete; in some cases, the extended reality presentation 120 is incomprehensible, e.g., if significant events 128 are only presented in the modality in which the user 106 has a deficit, and/or where corresponding content is presented in other modalities but is inadequate to compensate for the missing content. Indeed, the user 106 may not even realize that certain events 128 have occurred in the modality, and may therefore be confused by subsequent content (even if presented only in modalities in which the user 106 has no deficit) that requires knowledge of the earlier, missed events 128. For instance, in the example scenario 100 of FIG. 1, the event 128 comprising an attack by unidentified flying objects is represented in multiple modalities. A user 106 who has a visual deficit may therefore receive the sounds and haptic content of the second event 128, and may not even be able to understand the nature of the attack event 128 without the corresponding content in the visual channel 108. Moreover, the attack event is presaged by the earlier event 128 involving the appearance of unidentified flying objects on the horizon, which provides a steady buildup to users 106 who view the visual channel 108, but the attack event may be abrupt and startling to the user 106 who does not receive the visual channel 108.

Other aspects of extended reality presentations may exacerbate the diminished experience for users 106 with a deficit in one or more modalities. For example, many extended reality presentations 120 using a headset 102 may provide a 360-degree visual output. The user 106 may rotate and tilt his or her head to alter the perspective at will, but significant events 128 occurring in front of, to the left, to the right, and behind the current perspective of the user 106. In order to reconcile the user's freedom with the presentation of significant events in the visual channel 108, the extended reality presentation 120 may utilize the audio channel 112 to direct the attention of the user in the direction of particular events 128, leveraging the echolocation capabilities of a typical user 106; e.g., a particularly distinctive sound or audio cue may be presented in the right speaker near the user's right ear to signal the occurrence of an event 128 to the right of the user's current view. However, users 106 with a complete or partial hearing deficit, or who have a deficit in echolocation, may not hear the sound or cue, or may hear the sound or cue but may be unable to identify the direction connoted by the sound or cue. As a result, the user 106 may miss the event 128, which may confuse or diminish the user's understanding or appreciation of the extended reality presentation 120.

Presented herein are techniques for adjusting an extended reality presentation 120 to promote accessibility of the content for users 106 who have a deficit in one or more modalities that are utilized in the extended reality presentation 120.

Figure 2:
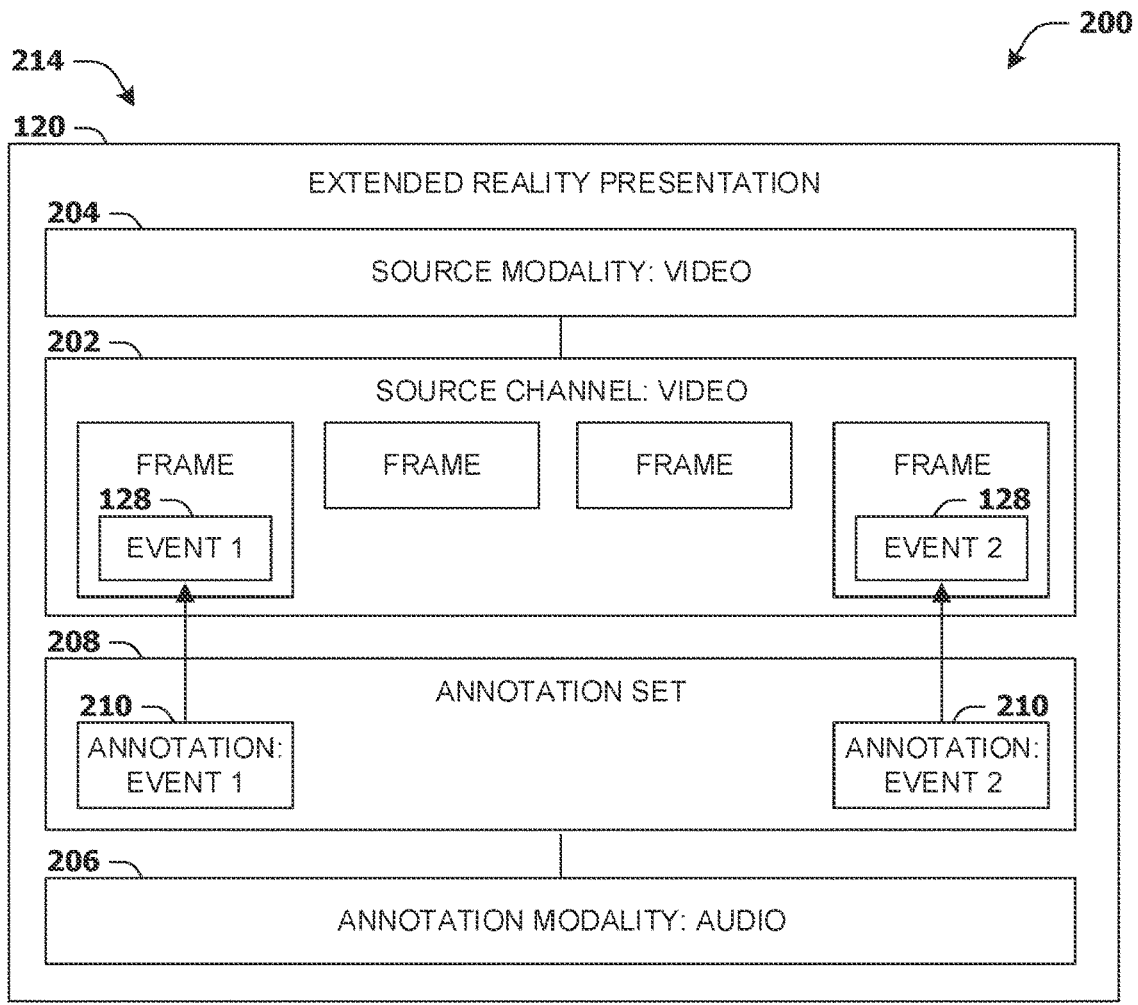
FIG. 2 is an illustration of a scenario involving a presentation of an extended reality presentation in accordance with the techniques presented herein.
Figure 2:
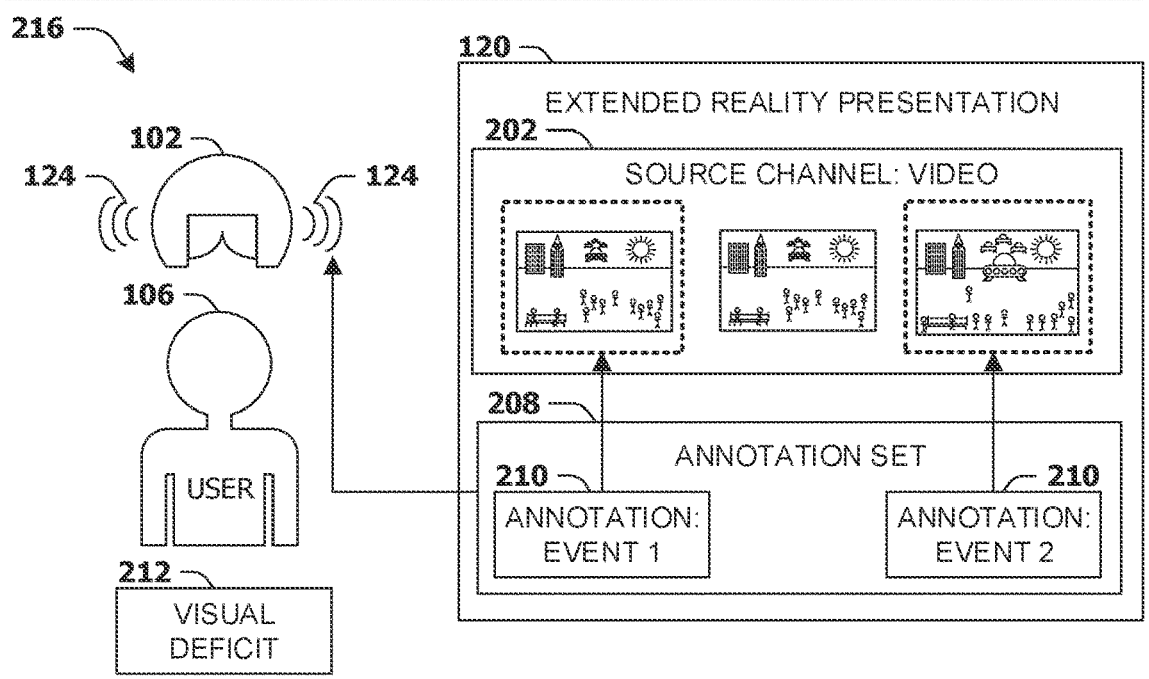

FIG. 2 is an illustration of an example scenario 200 featuring an extended reality presentation 120 adjusted in accordance with the techniques presented herein.

The example scenario 200 includes a first illustration 214 of an extended reality presentation 120 featuring a source channel 202 in a source modality 204 (e.g., a sequence of graphical frames that presents video for a visual modality) and a set of events 128 that present significant content for the extended reality presentation 120. The extended reality presentation further comprises an annotation set 208 of annotations 210 in an annotation modality 206 of the respective events 128 in the source channel 202, such as audio descriptions of the events 128 included in respective frames of the source channel 202. The annotation set 208 may comprise, e.g., a second audio channel 202 that may be presented concurrently with a first audio channel 202 providing audio content of the extended reality presentation 120. Alternatively, the annotation set 208 may comprise, e.g., audio descriptions of respective events 128 that may be generated and inserted into the extended reality presentation 120 whenever an event 128 arises within the source channel 202. The extended reality presentation 120 may also incorporate user input via the source modality 204 (e.g., providing a gaze-tracking feature that adapts the content based on a visual tracking of the user's eyes to identify the location of the user's gaze within a virtual environment) and/or the annotation modality 206 (e.g., receiving verbal commands from the user 106 that alter the content of the virtual environment).

The example scenario 200 also includes a second illustration 216 involving a presentation of the extended reality presentation 120 to a user 106 with a deficit 212 in the source modality 204. The user 106 may still wear a headset 102 that is capable of presenting both visual output via a pair of displays and audio output 124 via speakers. Due to the user's deficit 212 in the source modality 204, the extended reality presentation 120 may choose to present the annotation set 208 comprising annotations 210 of the events 128 in the annotation modality 206 (e.g., the audio channel 112), in which the user 106 does not have a deficit. If the user 106 has only a partial deficit 212 in the source modality 204 (e.g., limited but partial vision), the annotations 210 may be presented concurrently with the source channel 202 to supplement and highlight the events 128 of the source channel 202 in the audio channel 112. Alternatively, if the user 106 has a complete deficit 212 in the source modality 204 (e.g., complete loss of vision), the extended reality presentation 120 may present the annotations 210 in the annotation modality 206 as a substitute for the source channel 202 while refraining from presenting the source channel 202 (e.g., disabling video output to reduce power consumption, processor capacity, and/or heat production by the displays and rendering of visual content that the user 106 is unable to receive). Some users 106 may be able to use the source modality 204 for user input in at least a partial manner (e.g., gazing in the direction of events 128 that the user 106 is capable of locating via echolocation, thereby enabling a gaze-tracking component of the headset 102 to interpret the user's gaze as focusing on the event 128). Other users may be incapable of using the source modality 204 for user input, and user input through the annotation modality 206 also be utilized to receive user input that is interpreted as user input in the source modality 204 (e.g., receiving a verbal command to focus on an event 128 that the user 106 is able to locate via echolocate, but is unable to select via gaze-tracking techniques). In this manner, the extended reality presentation 120 is adaptive to provide a presentation that may otherwise be diminished or rendered inaccessible due to the deficit 212 of the user 106 in accordance with the techniques presented herein.

3. Technical Effects

The techniques presented herein may present a variety of technical effects with respect to other techniques for presenting an extended reality presentation 120 to a user 106, including the example scenario 100 of FIG. 1.

A first technical effect that may result from the techniques presented herein involves the adaptivity of an extended reality presentation 120 to provide accessibility to users 106 with deficits 212 in one or more modalities. Absent such adaptivity, such users 106 may experience only a limited portion of the extended reality presentation 120, and many such experiences may be rendered incomprehensible and/or unusable to such users 106. By translating events 128 in the source modality 204 in which the user 106 has a deficit 212 into annotations 210 in an annotation modality 206 in which the user 106 does not have a deficit 212, the techniques enable users 106 to participate in extended reality experiences that are otherwise inaccessible. In some scenarios, the adaptivity may involve presenting annotations 210 in an annotation modality 206 that are the same as the source modality 204 of the source channel 202; e.g., a user 106 who has a vision deficit 212 that involves partial but limited vision may not clearly see the content of a visual channel 108, and may benefit from the supplemental presentation of visual annotations 210 such as visual text descriptions of the events 128 arising in the visual channel 108.

A second technical effect that may result from the techniques presented herein involves the adaptivity of the extended reality presentations 120 to receive user input from users 106 with deficits 212 in certain modalities. Many technical scenarios promote basic accessibility of a media presentation, e.g., by permitting a substitution of a first modality for a second modality. However, many users 106 may have deficits 212 that are not fully addressed by a complete substitution, which may be inadequate, excessive, and/or otherwise an incomplete or unworkable adaptation of the extended reality presentation 120 to meet the deficits 212 and capabilities of a particular user 106.

As a first example of this second technical effect, some users 106 may have a visual deficit 212 in the form of limited color sensitivity that does not affect perception to detail, but that causes color-coded events 128 arising within the extended reality presentation 120 to be difficult to perceive. The accessibility of the extended reality presentation 120 for such users 106 may be promoted by the presentation of visual annotations 210 that are not color-coded, such as visual text annotations 210.

As a second example of this second technical effect, some users 106 may have a visual deficit 212 in the form of limited perception of detail, such as myopia or an astigmatism. The accessibility of the extended reality presentation 120 for such users 106 may be promoted by the presentation of visual annotations 210 that are of a larger and/or higher-contrast nature, such as monochromatic, highlighted, and/or oversized versions of the visual events 128.

As a third example of this second technical effect, some users 106 may not have a visual deficit 212, but instead may have a deficit 212 that limits the ability to view and understand highly dynamic visual presentations, such as a placement on an autism spectrum and/or a sensory processing disorder that causes the user 106 to be understimulated or overstimulated by certain forms of stimuli. In order to participate in an extended reality presentation 120, such users 106 may adapt the extended reality presentation 120 to provide annotations 210 in an annotation modality 206 that is easier to process. Alternatively or additionally, the user 106 may also adjust the number of annotations 210, such as selecting a verbosity level between a large rate of annotations 210 (e.g., a detailed narration of the events 128 in the visual channel 202) and a small rate of annotations 210 (e.g., a sparse narration that only describes the events 128 of highest significance arising within the visual channel 202). The provision of an annotation set 208 of annotations 210 over which the user 106 exert a degree of control may enable additional forms of adaptation of the extended reality presentation 120.

As a fourth example of this second technical effect, some user 106 may have multiple deficits 212, such as deficits 212 involving limitations in both vision and hearing. For such users 106, extended reality presentations 120 that offer to supplement an audio channel with visual captions may not significantly improve the accessibility of the extended reality presentation 120 for the user 106. Rather, an extended reality presentation 120 may include multiple annotation sets 208 in different modalities, including annotations 210 in a haptic modality that may annotate both the visual channel 108 and the audio channel 112 may promote the accessibility of the extended reality presentation 120 for the user 106.

As a fifth example of this second technical effect, users 106 may present deficits 212 that limit the provision of user input in a manner that an extended reality presentation 120 may be natively configured to receive. As a first such example, a user 106 who has a visual deficit 212 may not only be unable to see an event 128 arising within a visual channel 108, but may also be unable to respond with visual input that provides interactivity with the extended reality presentation 120, such as gaze-tracking techniques that detect where the user 106 is looking as input reflecting the user's point of attention. Instead, the annotation 210 of the event 128 in an annotation modality 206, such as an audio description, may include audio cues that prompt the user 106 to provide non-visual user input (e.g., verbal commands or manual gestures) that enable the user 106 to signal his or her attention to the event 128 described in the annotation. As a second example, a user 106 who has a hearing deficit 212 may not only be unable to hear an event 128 arising within an audio channel 112, but may be unable to use echolocation to determine the direction of the event 128 within a virtual environment, and may therefore be unable to change his or her perspective to view and/or engage with the event 128. In addition to annotating the event 128 in a visual channel 108, the techniques presented herein may involve visual cues of the direction of the event 128 and/or the user's options for interaction with the event 128, such as gazing at the event 128 or performing a manual gesture to select or perform an action with the event 128. In this manner, annotation of the source channel 202 may promote user interaction of extended reality presentations 120 that may otherwise remain inaccessible to users 106 with deficits 212.

A third technical effect that may be achieved by the techniques presented herein involves the adaptivity of an extended reality presentation 120 for a user 106 who does not have any particular deficits 212, but who simply wishes to view an alternative presentation of the extended reality presentation 120. As a first such example, a user 106 who has a typical visual capability may nevertheless find the visual stimulus in a particular extended reality presentation 120 to be distracting, such as where an excessive number of events 128 are concurrently arising. As a second such example, a user 106 may wish to consume an extended reality presentation 120 that is primarily visual, but may wish to do so while performing tasks that interfere with dedicated viewing of the extended reality presentation 120 and/or while viewing other visual media while listening to audio annotations 210 of the events 128 in the visual source channel 202. The adaptivity of the extended reality presentation 120 to meet the interests of the user 106, even in the absence of deficits 212, may provide an improved user experience. These and other technical effects may arise from the adaptivity of the extended reality presentation 120 in accordance with the techniques presented herein.

4. Example Embodiments

Figure 3:
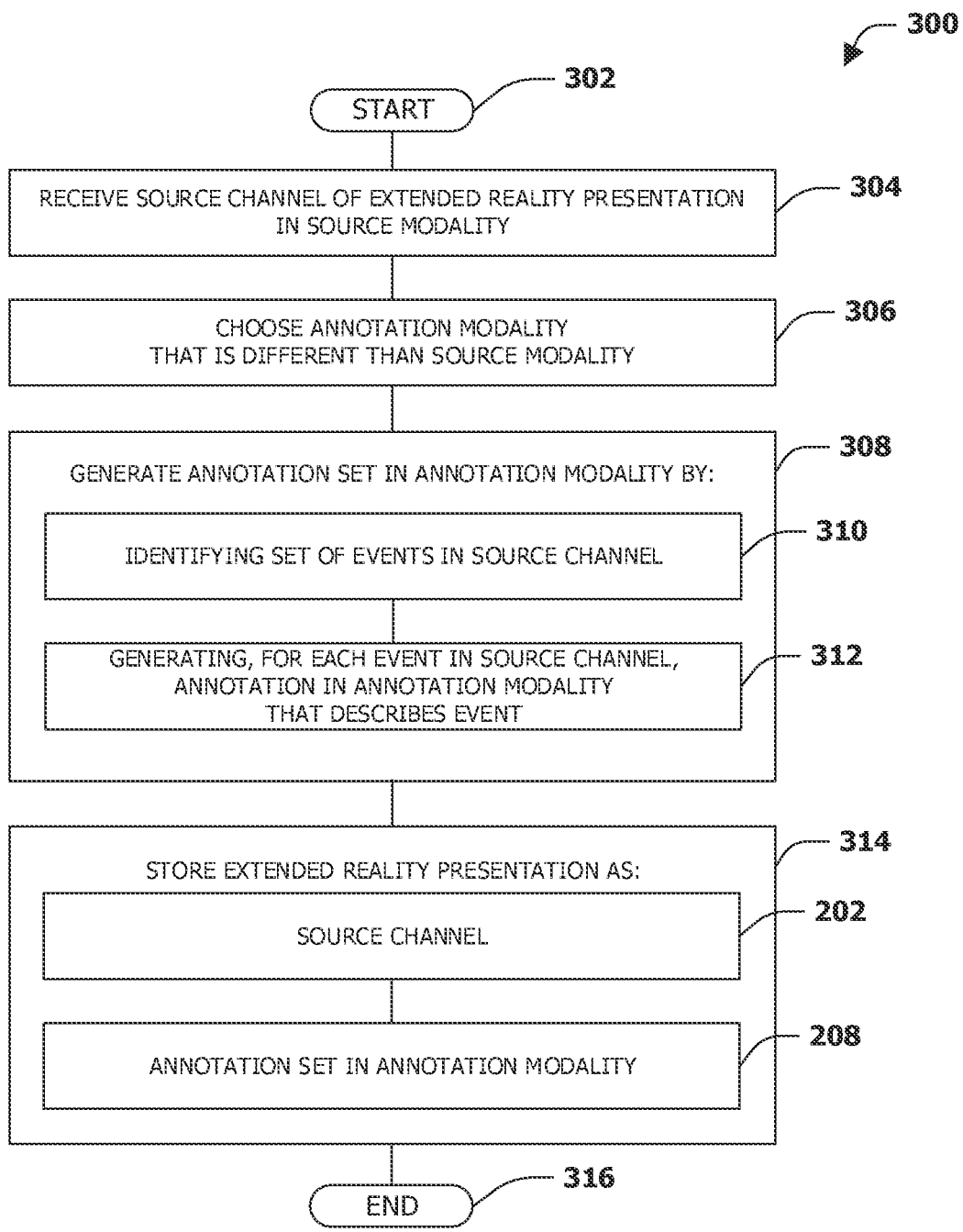
FIG. 3 is an illustration of an example method of generating an extended reality presentation in accordance with the techniques presented herein.

FIG. 3 presents an illustration of a first example embodiment of the techniques presented herein, illustrated as an example method 300 of generating an extended reality presentation 120. The example method 300 may be implemented, e.g., as instructions stored in a memory (e.g., a hard disk drive, a solid-state storage device such as a flash memory device, cloud-based storage, or a magnetic or optical disc) that, when executed on a processor of a device, cause the device to generate extended reality presentations 120 in accordance with the techniques presented herein. The example method 300 begins at 302 and involves executing instructions by the processor that cause the device to receive 304 a source channel 202 of the extended reality presentation 120 in a source modality 204. Execution of the instructions further causes the device to choose 306 an annotation modality 206. Execution of the instructions further causes the device to generate 308 an annotation set 208 in the annotation modality 206 by identifying 310 a set of events 128 in the source channel 202 and generating 312, for each event 128 in the source channel 202, an annotation 210 in the annotation modality 206 that describes the event 128. Execution of the instructions further causes the device to store 314 the extended reality presentation 120 as the source channel 202 and the annotation set 208 of annotations 210 in the annotation modality 206. Having achieved the annotation of the events 128 in the source channel 202, the example method 300 achieves the generation of the extended reality presentation 120 in accordance with the techniques presented herein, and so ends at 316.

Figure 4:
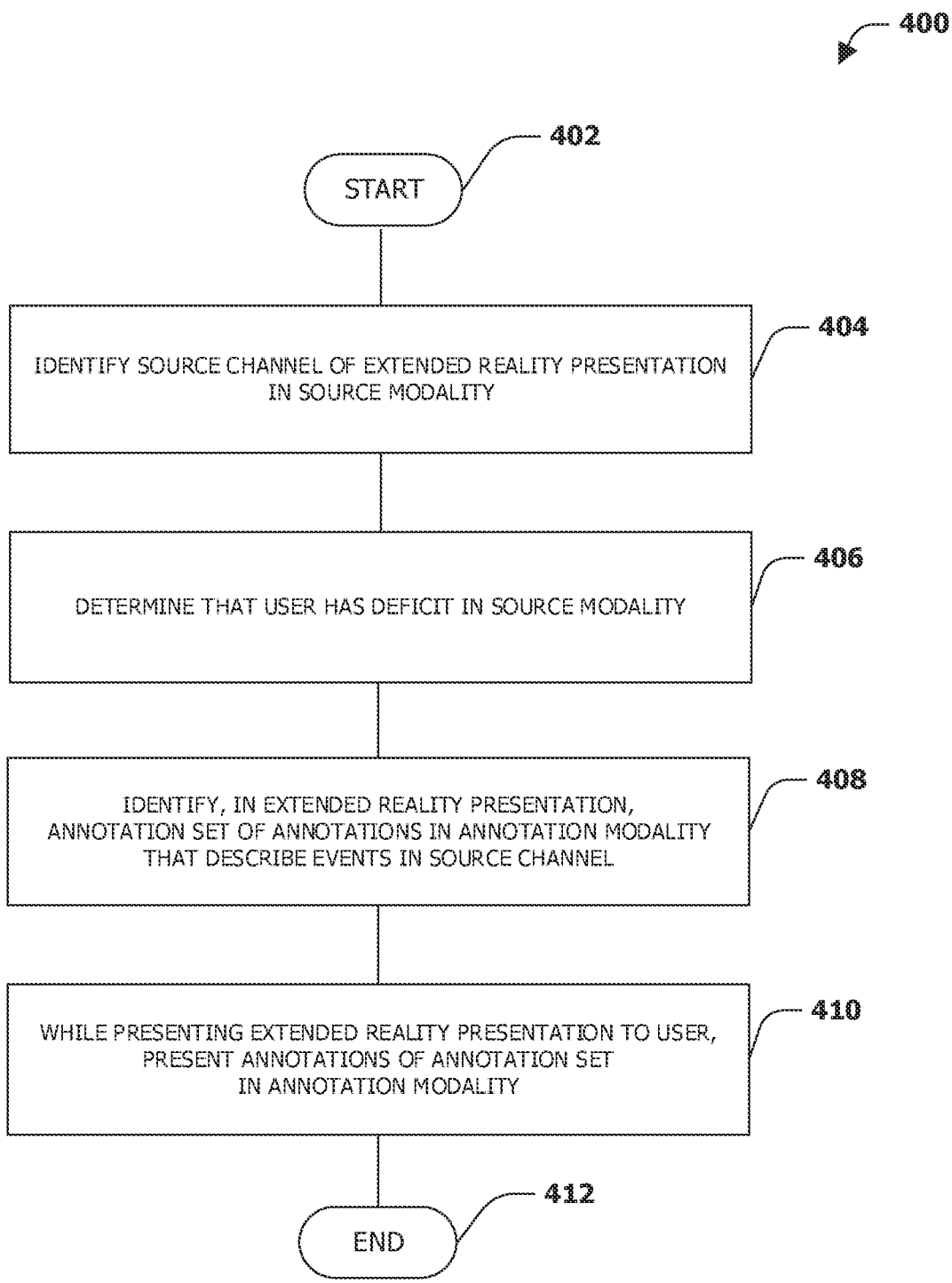
FIG. 4 is an illustration of an example method of presenting an extended reality presentation in accordance with the techniques presented herein.

FIG. 4 presents an illustration of a second example embodiment of the techniques presented herein, illustrated as an example method 400 of presenting an extended reality presentation 120 to a user 106. The example method 400 may be implemented, e.g., as instructions stored in a memory (e.g., a hard disk drive, a solid-state storage device such as a flash memory device, cloud-based storage, or a magnetic or optical disc) that, when executed on a processor of a device, cause the device to present an extended reality presentation 120 in accordance with the techniques presented herein. The example method 400 begins at 402 and involves executing, by the processor, instructions that cause the device to identify 404 a source channel 202 of the extended reality presentation 120 in a source modality 204. Execution of the instructions by the processor further causes the device to determine 406 that the user 106 has a deficit 212 in the source modality 204. Execution of the instructions by the processor further causes the device to identify 408, in the extended reality presentation 120, an annotation set 208 of annotations 210 in an annotation modality 206 that describe events 128 in the source channel 202. Execution of the instructions by the processor further causes the device to, while presenting the extended reality presentation 120 to the user 106, present 410 the annotations 210 of the annotation set 208 in the annotation modality 206. Having achieved the presentation of annotations 210 of the events 128 in the source channel 202, the example method 400 achieves the presentation of the extended reality presentation 120 in accordance with the techniques presented herein, and so ends at 412.

Figure 5:
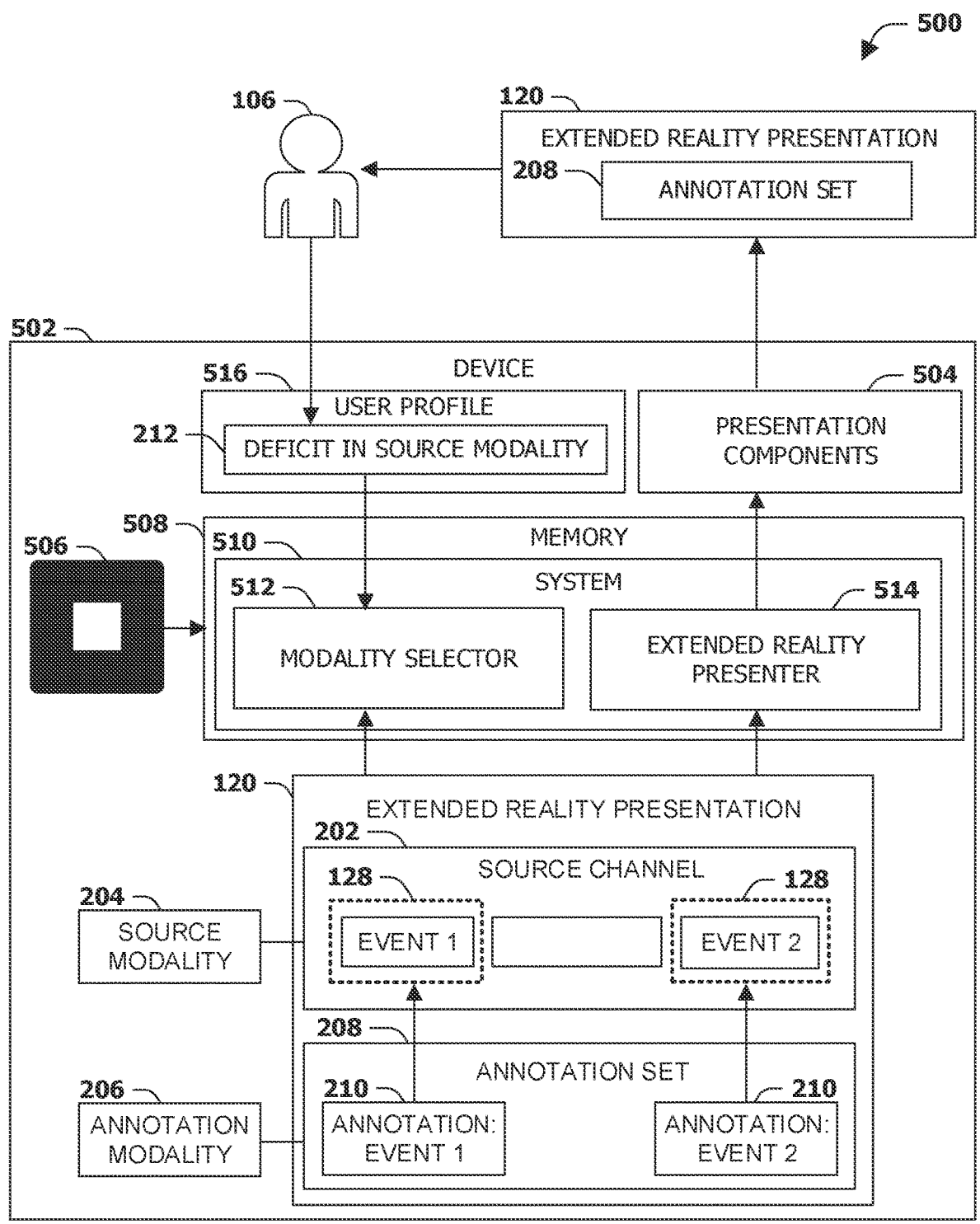
FIG. 5 is an illustration of an example scenario featuring a device comprising a system that presents an extended reality presentation in accordance with the techniques presented herein.

FIG. 5 is an illustration of an example scenario 500 featuring a third example embodiment of the techniques presented herein, comprising an example device 502 that presents an extended reality presentation 120 to a user 106. The example device 502 comprises a one or more presentation components 504, such as a display, a camera, a set of speakers, a microphone, a motor that generates haptic output such as vibration, and/or a touch sensor, pressure sensor, or inertial measurement unit that detects haptic input such as tapping, pressing, and/or altering an orientation of the example device 502. The example device 502 further comprises a processor 506 and a memory 508 storing instructions that, when executed by the processor 506, cause the example device 502 to generate an example system 510 of components, wherein interoperation of the components causes the example device 502 to operate in accordance with the techniques presented herein. The example system 510 includes a modality selector 512 that identifies 404 a source channel 202 of the extended reality presentation 120 in a source modality 204 and determines 406 that the user 106 has a deficit 212 in the source modality 204 (e.g., by examining a user profile 516 of the user 106 that indicates that the user 106 has a deficit 212 in a particular modality). In one such example device 502, the modality selector 512 chooses 306 an annotation modality 206 and generates 312, for each event 128 in the source channel 202, an annotation 210 in the annotation modality 206 that describes the event 128 in the source channel 202. In another such example device 502, the modality selector 512 identifies 408, in the extended reality presentation 120, an annotation set 208 of annotations 210 in an annotation modality 206 that describe events 128 in the source channel 202. In both such example devices 502, the example system 510 further comprises an extended reality presenter 514 that, while presenting the extended reality presentation 120 to the user 106, presents 410 the annotations 210 of the annotation set 208 in the annotation modality 206. In this manner, the example device 502 enables the presentation of the extended reality presentation 120 to the user 106 in a manner that promotes the accessibility of the content despite the deficit 212 of the user 106 in accordance with the techniques presented herein.

Figure 6:
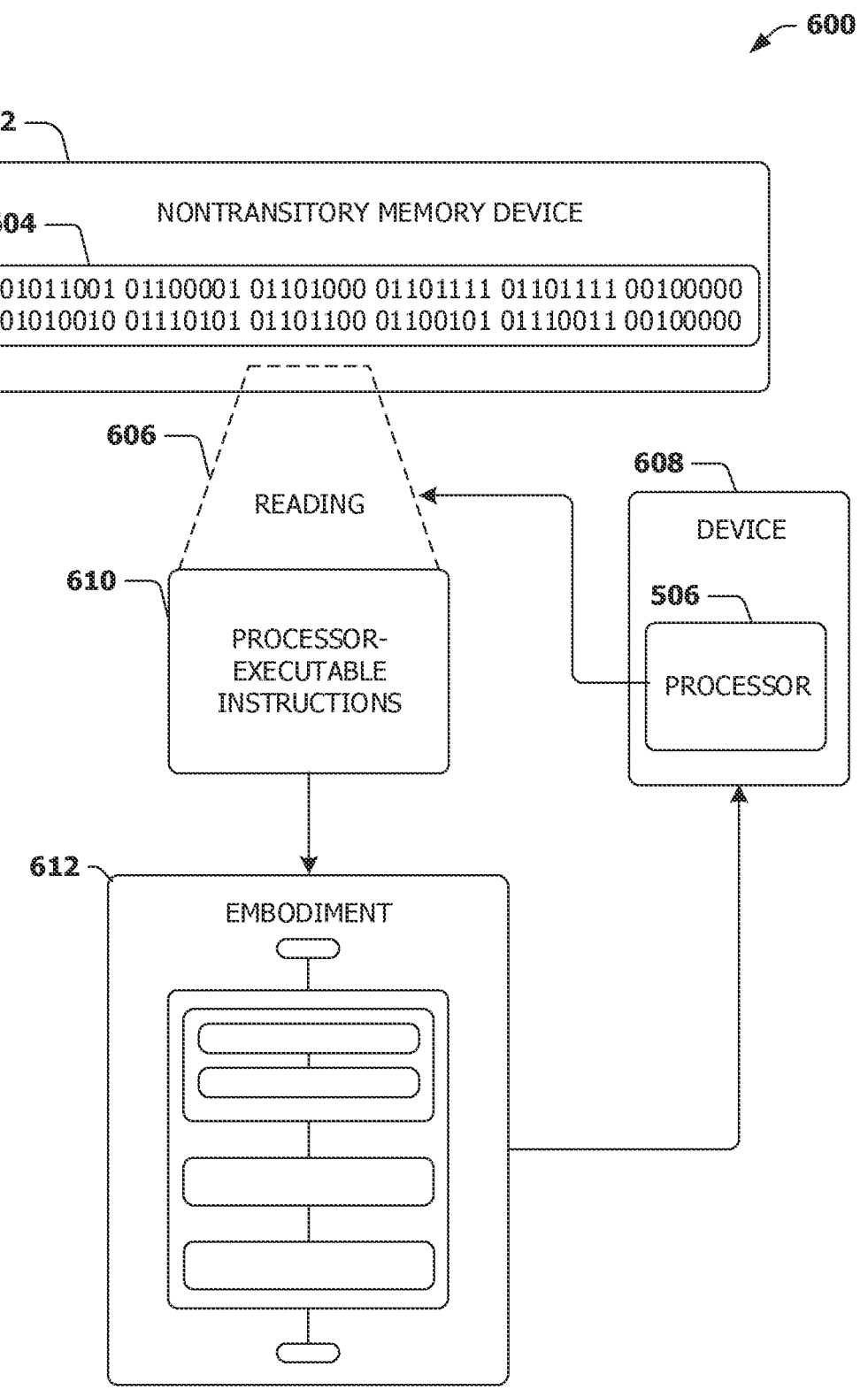
FIG. 6 is an illustration of a scenario featuring an example nontransitory memory device that causes a device to present an extended reality presentation in accordance with the techniques presented herein.

FIG. 6 is an illustration of an example scenario 600 involving a fourth example embodiment of the techniques presented herein, comprising an example nontransitory memory device 602, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, cloud-based storage, or a magnetic or optical disc (such as a CD, DVD, or floppy disk). The example nontransitory memory device 602 stores computer-readable data 604 that, when subjected to reading 606 by a reader 610 of a device 608 (e.g., a read head of a hard disk drive, or a read operation invoked on a solid-state storage device), express processor-executable instructions 612. The processor-executable instructions 612, when executed on a processor 506 of the device 608, cause the device 608 to generate an extended reality presentation 120, such as the example method 300 of FIG. 3. Alternatively or additionally, the processor-executable instructions 612, when executed on a processor 506 of the device 608, cause the device 608 to present an extended reality presentation 120 to a user 106, such as the example method 400 of FIG. 4. Many such types of computer-readable devices may be provided in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example method 400 of FIG. 4; the example device 502 of FIG. 5; and/or the example nontransitory memory device 602 of FIG. 6) to confer individual and/or synergistic advantages upon such embodiments.

5.1. Scenarios

A first aspect that may vary among embodiments of the techniques presented herein involves the scenarios within which such techniques may be utilized.

As a first variation of this first aspect, the techniques presented herein may be utilized with a variety of devices, such as workstations, laptop and palmtop computers, mobile phones, tablets, game consoles, media players, appliances, wearable devices such as headsets 102, and vehicle control systems. Such devices may also comprise a collection of devices, such as a device mesh of devices that a user utilizes together, including a wristwatch, a mobile phone, and a tablet. Such devices may store the extended reality presentation 120, generate the extended reality presentation 120, and/or receive the extended reality presentation 120 from a remote server. Such devices may be equipped with a variety of input devices in various modalities, such as one or more cameras, microphones, touch-sensitive displays, pressure sensors, orientation sensors such as inertial measurement units, and manipulable devices such as a glove that senses hand movements. Such input devices may perform a variety of analyses on user input from a user 106 to be used in the extended reality presentation 120, such as facial recognition, gaze tracking, kinematic analysis, gesture detection, and speech detection. Such devices may be equipped with a variety of output devices in various modalities, such as one or more displays, speakers, and motors that produce pressure or vibration. The modalities that are utilized by such devices may therefore include, e.g., visual, audial, and haptic input or output, optionally including other forms of input and output such as smell, taste, and balance.

As a second variation of this first aspect, the techniques presented herein may be used with a variety of extended reality presentations 120. The extended reality presentation may comprise an augmented reality presentation in which digital content supplements real-world people, places, or objects; an augmented virtuality presentation in which elements of the real world are integrated with a virtual environment; and/or virtual reality in which an immersive virtual environment is controlled by the user's actions. The nature of the extended reality presentation 120 may include, e.g., education, entertainment such as gaming, media presentation, research and simulation, user testing, information conveyance, and task facilitation. The extended reality presentation 120 may comprise pregenerated content, such as a sequence of events 128 that have been previously developed by a narrator or a computer and that are presented to the user 106 at a later date, and/or ad-hoc generated content that is generated by a device during the extended reality presentation 120. The extended reality presentation 120 may be completely passive (e.g., a non-interactive presentation of media that a user 106 is only permitted to view and consume, such as a three-dimensional movie in which the user 106 may only change perspective by turning his or her head); relatively static with low interaction (e.g., a branching narrative that occasionally permits a user 106 to choose among a limited selection of branching plot elements); and/or relatively dynamic with high interaction (e.g., a game in which the virtual environment rapidly responds to the user's actions). The extended reality presentation 120 may comprise a two-dimensional presentation; a three-dimensional presentation, such as a stereographic presentation; and/or a panoramic presentation that the user 106 may view by rotating his or her head, or by changing an orientation of a device. The extended reality presentation 120 may be static, such as a fixed image, or dynamic, such as a media stream that plays over time. The events 128 arising within the source channel 202 may comprise a variety of event types, including an appearance of an object; a presence of an object; a disappearance of an object; a transformation of an object into a different form; an interaction among two or more objects; an action of a character; an interaction among two or more characters; a transition among scenes in the source channel 202; and an opportunity for a user 106 to act. Many such variations may arise in the scenarios within which the currently presented techniques may be utilized.

5.2. Generating Annotations

A second aspect that may vary among embodiments of the techniques presented herein involves the generation of the annotations 210 of the extended reality presentation 120 in the annotation modality 206.

As a first variation of this second aspect, annotations 210 for respective events 128 may be generated by a user, who may provide them as metadata descriptors of the events 128 arising within the source channel 202. For example, an animator of a digital scene may author or provide annotations 210 that are to be attached to respective events 128. The annotations 210 may be provided in first annotation modality 206 (e.g., written text annotations 210 that may be presented visually) but may be presented to the user 106 viewing the extended reality presentation 120 in a second annotation modality 206 (e.g., text-to-speech translations presented in an audio modality).

As a second variation of this second aspect, annotations 210 for respective events 128 may be automatically generated by an annotation tool. As a first such example, a video analysis tool may evaluate a video source channel 202 to identify significant events 128, such as the appearance of a character, a departure of a character, or an interaction between two or more characters, and may automatically generate text descriptions of the video content of the source channel 202. The text descriptions may be formulated as annotations 210 in the same annotation modality 206 (e.g., visual annotations 210, such as written text) or may be translated into a different annotation modality 206 (e.g., text-to-speech translation to provide audio annotations 210). As a second such example, the audio content of an audio source channel 202 may be evaluated by a speech or sound analysis tool and corresponding visual annotations 210 may be provided, such as a visual flash that accompanies a sharp sound like an explosion. As a third such example, the content of a haptic channel 116 may be evaluated to determine a set of haptic content, and visual or audio cues that describe the haptic content (e.g., "rumble," "tap," "bang," and "shake") may be generated as annotations 210 of the haptic content in a different modality. As a fourth such example, haptic annotations may be generated as haptic signals of significant events, such as a tapping or pulsing that corresponds to a loud audio sequence in an audio source channel 202 or a sudden visual event in a video source channel 202. In these and other scenarios, where the source channel 202 is digitally generated, the analysis tools may evaluate either the output of the digital generation (e.g., a visual channel 108, audio channel 112, or haptic channel 116 produced by the automated tools) or the underlying data utilized by the digital generation (e.g., a scene model, a set of object models, and a script that are provided to a graphics renderer to generate a digitally generated media stream) to identify the events 128 and/or generate the annotations 210. Alternatively or additionally, such tools may comprise part of the digital media generation process; e.g., in addition to rendering an audiovisual presentation of a virtual environment, the renderer may generate annotations 210, in various annotation modalities 206, of the events 128 arising therein.

As part of this second variation of this second aspect, an automated technique may automatically identify events 128 arising within the source channel 202 that are to be annotated. As a first example, an automated tool may generate a complete set of annotations 210 for all events 128 arising in the source channel 202—e.g., a complete script that describes a scene and the presence, movements, and interactions of all characters and objects in the scene—and a device that later presents the extended reality presentation 120 to a user 106 may choose which annotations 210 to include in the adapted presentation. As a second example, an automated annotation tool may limit the generation of annotations 210 to those that describe events 128 that are significant within the extended reality presentation 120. For example, an automated technique may identify a set of candidate events in the source channel 202 (e.g., all events 128 that are amenable to annotation); identify a significance of each candidate event in the extended reality presentation 120; and select, for annotation 210, the candidate events having a significance that exceeds a significance threshold. As a first such example, significance may be determined by the relevance of the event, object, character, or interaction for a narrative arc. As a second such example, significance may be determined by a reaction or consequence of an occurrence, object, character, or interaction on other occurrences, objects, characters, or interactions of the scene. As a third such example, significance may be determined by metadata indicating event priority (e.g., in a scene featuring a crowd, a particular character in the scene may be identified as a key character in a narrative arc or as a character represented by the user 106, and annotations 210 may be limited to events 128 that involve the particular character). As a fourth such example, significance may be determined by recency, such as a first occurrence, object, character, or interaction that occurs within a scene or a latest occurrence, object, character, or interaction that occurs within a scene. As a fifth such example, significance may be determined by proximity to a particular location; e.g., in extended reality presentations 120 in which the user 106 has a first-person perspective, the annotations 210 may be limited to occurrences, objects, characters, and/or interactions that arise nearest the location of the first-person perspective within the scene. As a sixth such example, significance may be determined by size, such as occurrences or interactions that involve a maximum number of objects or characters in a scene. As a seventh such example, significance may be determined by duration, such as occurrences or interactions that are fleeting or that are protracted. As an eighth such example, significance may be determined by dynamic character, such as the most rapidly moving character or object in a scene or the most stationary character or object in the scene.

As a third variation of this second aspect, an annotation set 208 of annotations 210 may be generated in advance and stored in the extended reality presentation 120 along with the source channel 202. As a first such example, an extended reality presentation 120 may store a visual channel 108, and also a first annotation set 208 provided in an audio annotation modality 206 of the events 128 arising in the visual channel 108 and a second annotation set 208 provided in a haptic annotation modality 206 of the events 128 arising in the visual channel 108. Alternatively or additionally, the extended reality presentation 120 may store an audio channel 112, and also a first annotation set 208 provided in a visual annotation modality 206 of the events 128 arising in the audio channel 112 and a second annotation set 208 provided in a haptic annotation modality 206 of the events 128 arising in the audio channel 112. In some scenarios, one or more annotation sets 208 may be provided in the same annotation modality 206 as the source channel 202, e.g., visual annotations 210 of events 128 arising in a source channel 202. As a second such example, an annotation set 208 may be included in an extended reality presentation 120 as an annotation channel (e.g., a video stream that integrates visual annotations 210 of events 128 arising in an audio channel 112) or as metadata (e.g., metadata description of events 128, where the metadata may be rendered as annotations 210 in the annotation modality 206 that accompany the events 128 in the source channel 202).

As a fourth variation of this second aspect, an annotation set 208 of annotations may generated ad-hoc during the presentation of the extended reality presentation 120 to the user 106. For example, the extended reality presentation 120 may be previously generated and stored, and the annotation set 208 may be generated while the events 128 in the pregenerated extended reality presentation 120 occur. Alternatively, the extended reality presentation 120 may also be generated ad-hoc (e.g., a game that a user 106 is currently playing, where a virtual scene is rendered by a graphics renderer on a just-in-time basis) and the annotation set 208 may be similarly rendered on an ad-hoc basis.

As a fifth variation of this second aspect, the annotation set 208 may include user input in various modalities. For example, if the source channel 202 comprises a sequence of user input in a source modality 204 in which the user 106 has a deficit (e.g., options to gaze at particular objects to activate certain selections or actions within the extended reality presentation 120, which a user 106 with a vision deficit 212 may be unable to provide), the annotation 210 may involve translating the user input into annotations 210 in an annotation modality 206 that reflect the user's actions that correspond with the events 128 in the source modality 204 (e.g., haptic input, such as manual gestures, that the user 106 has performed and that correspond to gaze-tracking user input). Rather than presenting the annotations 210 to the user 106, this variation may involve presenting the annotations 210 to a device 104 that is providing the extended reality presentation 120, such as a graphics renderer that takes user input into account to alter the perspective or reflect certain user actions in a rendered graphical environment. In this manner, extended reality presentations 120 that involve a particular type of user input in the source modality 204 may be made accessible to users 106 who have a deficit in the source modality 204, but who are capable of interacting in an annotation modality 206. Many such variations may be provided in the detection of events 128 and the generation of annotations 210 in accordance with the techniques presented herein.

5.3. Source and Annotation Modalities

A third aspect that may vary among embodiments of the techniques presented herein involves determining a deficit 212 of a user 106 in a source modality 204 and choosing an annotation modality 206 of annotations 210 of events 128 arising in a source channel 202 in the source modality 204.

As a first variation of this third aspect, a device may determine that a user 106 has a deficit 212 in a source modality 204 in a variety of ways. As a first such example, the device may have access to a user profile 516 of the user 106 that indicates that the user 106 has a deficit 212 in a particular modality that corresponds to a source modality 204 of a source channel 202 of the extended reality presentation 120. The device may examine the user profile 516 of the user 106 and identifying a notation in the user profile 516 indicating the deficit 212 of the user 106 in the source modality 204.

As a second variation of this third aspect, a device may receive, from the user 106, an indication of a deficit 212 of the user 106 in the source modality 204. For example, an application may provide options in a visual menu for a user 106 to indicate a deficit 212 in hearing, speech, and/or haptic user input or output, and the application may substitute annotations 210 in a visual annotation set 208 for the modalities in which the user 106 has a deficit 212.

As a third variation of this third aspect, a device may infer that a user 106 has a deficit 212 in the source modality 204. For example, a helmet may present a set of directional audio cues that are likely to prompt a user 106 without a hearing deficit 212 to turn his or her head to follow the direction of the audio cues via echolocation. If the device detects that the user 106 fails to respond or responds incorrectly to the directional audio cues, the device may include visual annotations 210 of the directions of events 128 arising in the audio channel 112.

As a fourth variation of this third aspect, a device may determine that a user 106 has a deficit 212 based on the user's history of viewing extended reality presentations 120. For example, a device may examine a second extended reality presentation that was previously presented to the user 106 and determine that the second extended reality presentation 120 was presented to the user 106 with a selection of an annotation modality 206 to describe events 128 in the source channel 202 of the second extended reality presentation 120. The device may interpret the selection by the user 106 as implying that the user 106 has a deficit 212 in the source modality 204, and therefore apply the same selection to the current extended reality presentation 120 for the same user 106.

As a fifth variation of this third aspect, a device may choose the annotation modality 206 in various ways. In a first scenario, the extended reality presentation 120 may store a first annotation set 208 of annotations 210 in a first annotation modality 206 that describe the events 128 in the source channel 202 and a second annotation set 208 of annotations 210 in a second annotation modality 206 that also describe the events 128 in the source channel 202. Between the first annotation set 208 and the second set 208, the device may identify the annotation set 208 by selecting a selected annotation modality 206 for the user 106 and selecting the annotation set 208 in the selected annotation modality 206 for the extended reality presentation 120. In a second scenario, a device may be capable of generating annotations 210 of events 128 in the source channel 202, or of translating annotations 210 in a first annotation modality 206 (e.g., haptic notifications of audio events 128) into other annotation modalities 206 to be used for the extended reality presentation 120 (e.g., visual or audio notifications in lieu of the haptic notifications). In these and other scenarios, the selection of the annotation modality 206 may involve a variety of factors.

As a first such example, between a first annotation modality 206 and a second annotation modality 206, a user 106 may also have a deficit 212 in the first annotation modality 206 but may have no deficit 212 in the second annotation modality 206, and the second annotation modality 206 may be selected for the extended reality presentation 120.

As a second such example, between a first annotation modality 206 and a second annotation modality 206, a user 106 may have a greater deficit 212 in the first annotation modality 206 but a lesser deficit 212 in the second annotation modality 206, and the second annotation modality 206 may be selected for the extended reality presentation 120. For instance, the deficit 212 of a user 106 in the source modality 204 may be determined as complete, severe, or significant enough to interfere with the events 128 in the source channel 202, and the annotation modality 206 may be selected as a different modality than the source modality 204. Conversely, the deficit 212 of a user 106 in the source modality 204 may be determined as partial or not significant enough to interfere with the events 128 in the source channel 202 (e.g., a mild visual impairment that makes visual events 128 perceivable but difficult to understand), and the annotation modality 206 may be selected as a visual modality that such that visual annotations 210 are presented to supplement the visual channel 202.

As a third such example, between a first annotation modality 206 and a second annotation modality 206, a device may determine that the first annotation modality 206 is more compatible with the source channel 202 than the second annotation modality 206 for the extended reality presentation 120 (e.g., it may be easier to present haptic cues of audio events 128 than visual cues), and may therefore select the first annotation modality 206 for the annotation set 208.

As a fourth such example, between a first annotation modality 206 and a second annotation modality 206, a device may determine that the first annotation modality 206 is natively provided while the second annotation modality 206 is translated from the first annotation modality 206, and may therefore select the first annotation modality 206 as likely capturing the events 128 of the source channel 202 with greater accuracy and fidelity than translations of the annotations 210 into the second annotation modality 206.

As a fifth such example, between a first annotation modality 206 and a second annotation modality 206, a device may determine that the extended reality presentation 120 has a native channel in the first annotation modality 206 but does not have a native channel in the second annotation modality 206. For instance, in choosing an annotation modality 206 for events 128 in a video channel 108, a device may determine that the extended reality presentation 120 already has a native audio channel 112 but does not have a haptic channel 116, and may therefore select the haptic channel 116 for annotations 210 of the events 128 in the visual channel 108 in order to avoid conflicts with the native audio content of the audio channel 112.

As a sixth such example, between a first annotation modality 206 and a second annotation modality 206, a device may be equipped to provide annotations 210 in the first annotation modality 206, but not equipped to provide annotations 210 in the second annotation modality 206. For example, in choosing annotations for an audio channel 112, a device may determine that it has a motor 118 but no display 110, and may therefore choose a haptic modality as the annotation modality 206. Many such techniques may be utilized to determine the deficit 212 in the source modality 204 and the annotation modality 206 to be used for the extended reality presentation 120 in accordance with the techniques presented herein.

Figure 7:
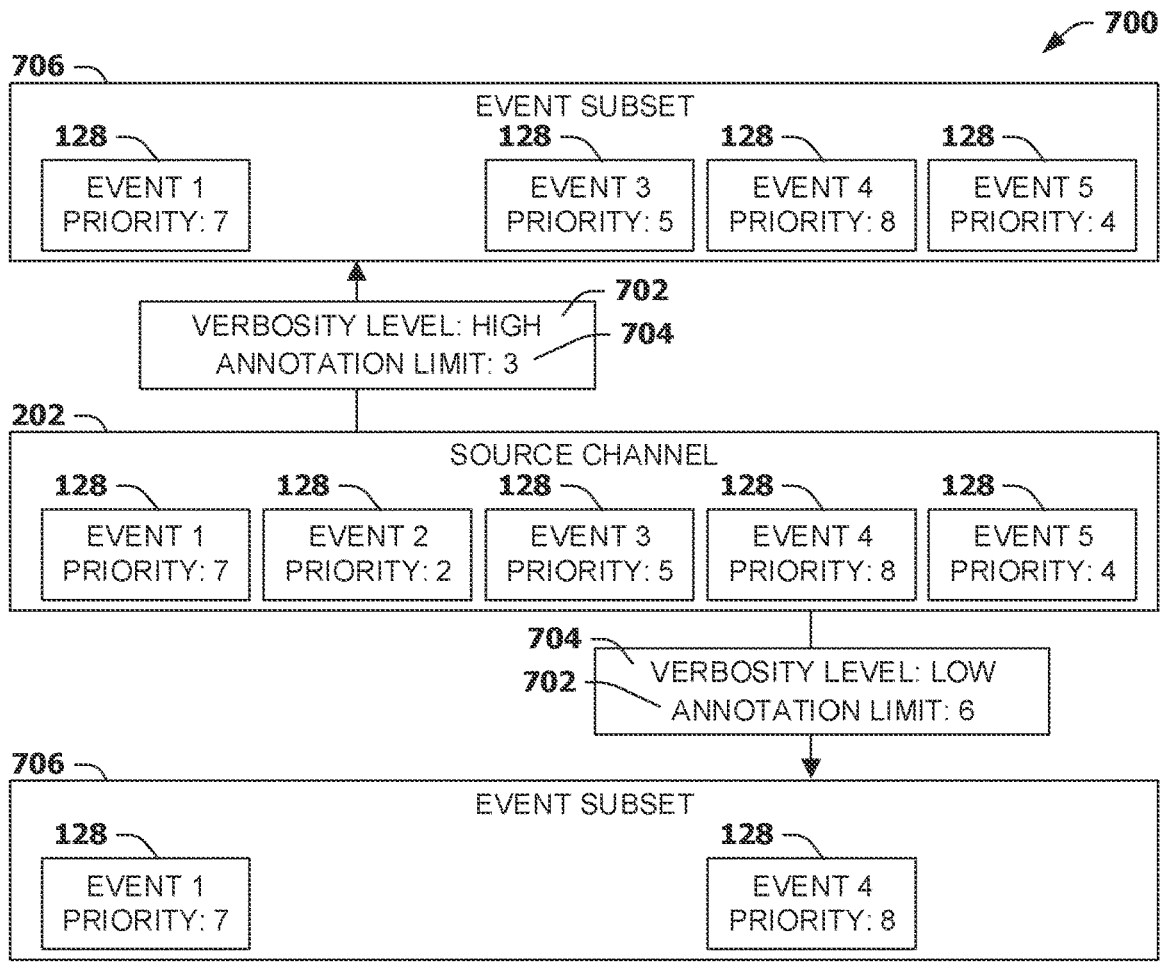
FIG. 7 is an illustration of example scenarios involving a limitation of annotations to an event subset in accordance with the techniques presented herein.

FIG. 7 is an illustration of an example scenario 700 featuring a generation and/or presentation of annotations 210 of events 128 occurring in a source channel 202. In this example scenario 700, the source channel comprises five events 128 with a variable priority, represented by a numeric value where higher values indicate a higher priority for the events 128 in the context of the extended reality presentation 120. The example scenario 700 includes an annotation limit 704 represented as a priority threshold, where events 128 with a priority above the priority threshold are to be presented and events 128 with a priority below the priority threshold are to be omitted. Additionally, the annotation limit 704 is indicated as a verbosity level 702, where a high verbosity level 702 lowers the annotation limit 704 such that more events 128 are presented; e.g., applying the high verbosity level 702 to filter the source channel 202 results in an event subset 706 comprising four events 128 to be presented as annotations 210. Alternatively, a low verbosity level 702 raises the annotation limit 704 such that a smaller number of high-priority events 128 are presented; e.g., applying the low verbosity level 702 to the source channel 202 results in an event subset 706 comprising only two events 128 to be presented as annotations 210. In this manner, the number of events 128 presented as annotations 210 may be selectable to vary the verbosity of the extended reality presentation 120 in accordance with the techniques presented herein.

5.4. Presenting Extended Reality Presentation

A fourth aspect that may vary among embodiments of the techniques presented herein involves presenting the extended reality presentation 120.

As a first variation of this fourth aspect, presenting the annotation modality may involve concurrently presenting the annotation set 208 of annotations 210 in the annotation modality 206 and the events 128 in the source channel 202 (e.g., supplementing the source channel 202 with the annotation set 208). Alternatively, presenting the annotation modality may involve substituting the annotation set 208 of annotations 210 in the annotation modality 206 for the events 128 in the source channel 202 and refraining from presenting the events 128 in the source channel 202 (e.g., replacing the source channel 202 with the annotation set 208).

As a second variation of this fourth aspect, an annotation 210 may be presented in the extended reality presentation 120 in numerous ways. As a first such example, annotations 210 in a visual modality may comprise, e.g., text, symbols, still or moving images, or objects or characters inserted into a virtual environment. Such annotations 210 may also include modifications of a visual channel 108, such as highlighting, coloring, resizing, repositioning, animating, duplicating, or removing other visual components such as text, symbols, still or moving images, or objects or characters. As a second such example, annotations 210 in an audio modality may comprise, e.g., tones, sound effects, speech, and/or music, or modification of existing audio components such as amplification, attenuation, pitch adjustment, or modulation to a different audio profile. As a third such example, annotations 210 in a haptic modality may comprise, e.g., pulses, vibration, pressure, and/or forces that amplify or resist user motion. Many such annotation modalities 206 and types of annotations 210 presented therein may be utilized in the techniques presented herein.

As a third variation of this fourth aspect, a selected event 128 in the source channel 202 may further comprise a direction of the event 128 relative to a perspective of the user 106 in the extended reality presentation 120. As a first such example, in a two-dimensional presentation, the direction of the event 128 may be determined with respect to the location of a cursor. As a second such example, in a three-dimensional first-person presentation, the direction of the event 128 may be determined with respect to a focal point of the user 106. As a third such example, in an extended reality presentation 120 in which the user 106 has selected or controls a particular character or object, the direction of the event 128 may be determined with respect to the location of the particular character or object. In such scenarios, presenting the annotation set 208 may further involve presenting a directional cue in the annotation modality 206 for the event 128 in the source channel 202, where the directional cue indicates the direction of the event relative to a reference point.

As a fourth variation of this fourth aspect, the extended reality presentation 120 may vary the number, density, and/or rate of annotations 210 presented to the user 106 in the annotation modality 206. For example, a device may identify an annotation limit of annotations 210 to be presented in the annotation modality 206 (e.g., a maximum number of annotations 210, or a maximum number of annotations 210 per unit of time) and may limit the presenting of annotations 210 in the annotation modality 206 to the annotation limit. Such limiting may reduce the incidence of information overload, in which the user 106 may be presented with too much information to receive and understand.

As a first example of this fourth variation, a device may receive from the user 106 a selection of an annotation limit for the annotation modality 206 (e.g., a maximum number of annotations 210, or a maximum number of annotations 210 per unit of time, or a selection of a verbosity level such as "verbose," "average," or "terse" that translate to a high, medium, or low maximum number of annotations 210), and the device may apply the annotation limit received from the user 106.

As a second example of this fourth variation, a device may determine an annotation limit for the annotation modality 206 (e.g., a maximum number of annotations 210 that typical users 106 may be able to receive in the annotation modality 206, such as a maximum number of haptic impulses to present per unit of time).

As a third example of this fourth variation, a device may determine an annotation limit based on the extended reality presentation 120 (e.g., selecting a higher annotation limit for extended reality presentations 120 that users 106 expect to be dynamic, active experiences, such as rapid-reaction-time games, than for extended reality presentations 120 that users 106 expect to be calmer, slower-moving experiences, such as an artistic presentation).

As a fourth example of this fourth variation, annotations 210 may be limited to those that to a user context of the user 106 within the extended reality presentation. As an example, if the user 106 has selected a particular occurrence, object, character, or interaction within the extended reality presentation 120, the device may identify, among the events in the source channel 202, an event subset of events 128 that relate to the user context and limit the presenting of annotations 210 in the annotation modality 206 to annotations 210 of the event subset.

As a fifth variation of this fourth aspect, when the annotation modality 206 is selected for which the extended reality presentation 120 does not have a native channel (e.g., a haptic annotation modality 206 for annotations 210 in a visual source channel 202 for an extended reality presentation 120 that does not have a native haptic channel 116), a device may initiate the channel for the annotation modality 206 and coordinate the presentation of annotations 210 in the annotation modality 206 with the occurrence of events 128 in the source modality 204. Alternatively, when the annotation modality 206 is selected for which the extended reality presentation 120 also has a native channel (e.g., an audio annotation modality 206 for an extended reality presentation 120 that has a native audio channel 112), a device may integrate the annotations 210 with the native content in the annotation modality 206. As one such example, the device may emphasize the annotations 210 relative to the content of the native modality channel (e.g., presenting audio annotations 210 that are louder than the native audio, such as by temporarily reducing the volume of the native audio while presenting an audio annotation 210).

As a sixth variation of this fourth aspect, a device presenting an extended reality presentation 120 may receive user input from the user 106 that connotes an event selection of a selected event 128, such as a selection of an occurrence, object, character, or interaction in a real-world presentation or a virtual environment. Responsive to the event selection, the device may present the annotation 210 of the selected event 128 in the annotation modality 206. That is, alternative or additional to a proactive presentation of annotations 210, the device may provide annotations 210 in a reactive manner when the user 106 initiates a selection. Even if the content of the extended reality presentation 120 is not particularly interactive (e.g., a fixed, non-interactive content presentation such as a conventional movie or television program), the capability of selecting events 128 and receiving annotations 210 in the annotation modality 206 may promote the accessibility of the extended reality presentation 120 for the user 106.

Additional variations of this fourth aspect involve user interaction with an extended reality presentation 120. In some extended reality presentations 120, such as games, users 106 may be permitted to provide user input that alters the content of extended reality presentation 120. The techniques presented herein may be used to facilitate the prompting, informing, and receipt of user input for application within the extended reality presentation 120.

As a seventh variation of this fourth aspect, the extended reality presentation 120 may comprise an interaction event 128 that permits user interaction within the extended reality presentation. For example, among a set of occurrences, objects, characters, and/or interactions arising in a scene, a subset may permit users 106 to select, alter, and/or participate in such interaction events 128. The presentation of annotations 210 in the annotation modality 206 may facilitate the accessibility of the interaction events 128 to the user 106 despite the user's deficit 212 in the source modality 204 of the source channel 202 in which such interaction events 128 arise.

As a first example of this seventh variation, the device may present an annotation 210 indicating the presence of at least one selectable interaction event 128, such as a distinctive audio cue indicating that an event within the extended reality presentation 120 permits selection for interaction. In some variations, the annotation 210 may indicate an interaction type of interaction that is permitted by the interaction event 128, such as annotations 210 of a first annotation type that permit focusing on the interaction event 128; annotations 210 of a second annotation type that permit modifying the interaction event 128; and annotations 210 of a third annotation type that permit removal of the interaction event 128.

As a second example of this seventh variation, the device may present an annotation 210 that confirms an initiation of the annotation event 128 by the user. When a device detects user input by the user 106 that initiates the interaction event, the device may generate, in the annotation modality 206, an interaction annotation 210 that indicates the initiating of the interaction event 128. For example, if a visual source channel 202 includes a visual interaction event 128 that permits interaction, the direction and selectability of the interaction event 128 may be presented by an annotation 210 in an audio annotation modality 206 (e.g., a directional audio cue), and the selection of the interaction event 128 by the user 106 may be confirmed by a second annotation 210 comprising a distinctive audio cue or a haptic impulse. Many such variations may be utilized in the presentation of annotations 210 in the annotation modality 206 while presenting the extended reality presentation 120 in accordance with the techniques presented herein.

Figure 8:
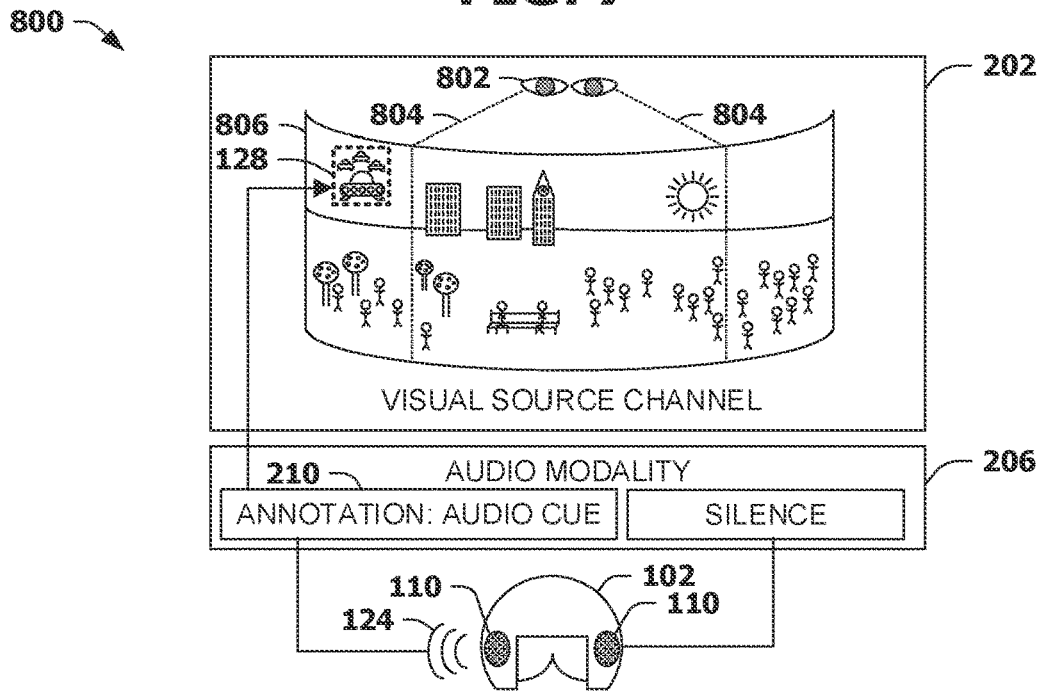
FIG. 8 is an illustration of example scenarios involving a first presentation of an extended reality presentation in accordance with the techniques presented herein.
Figure 9:
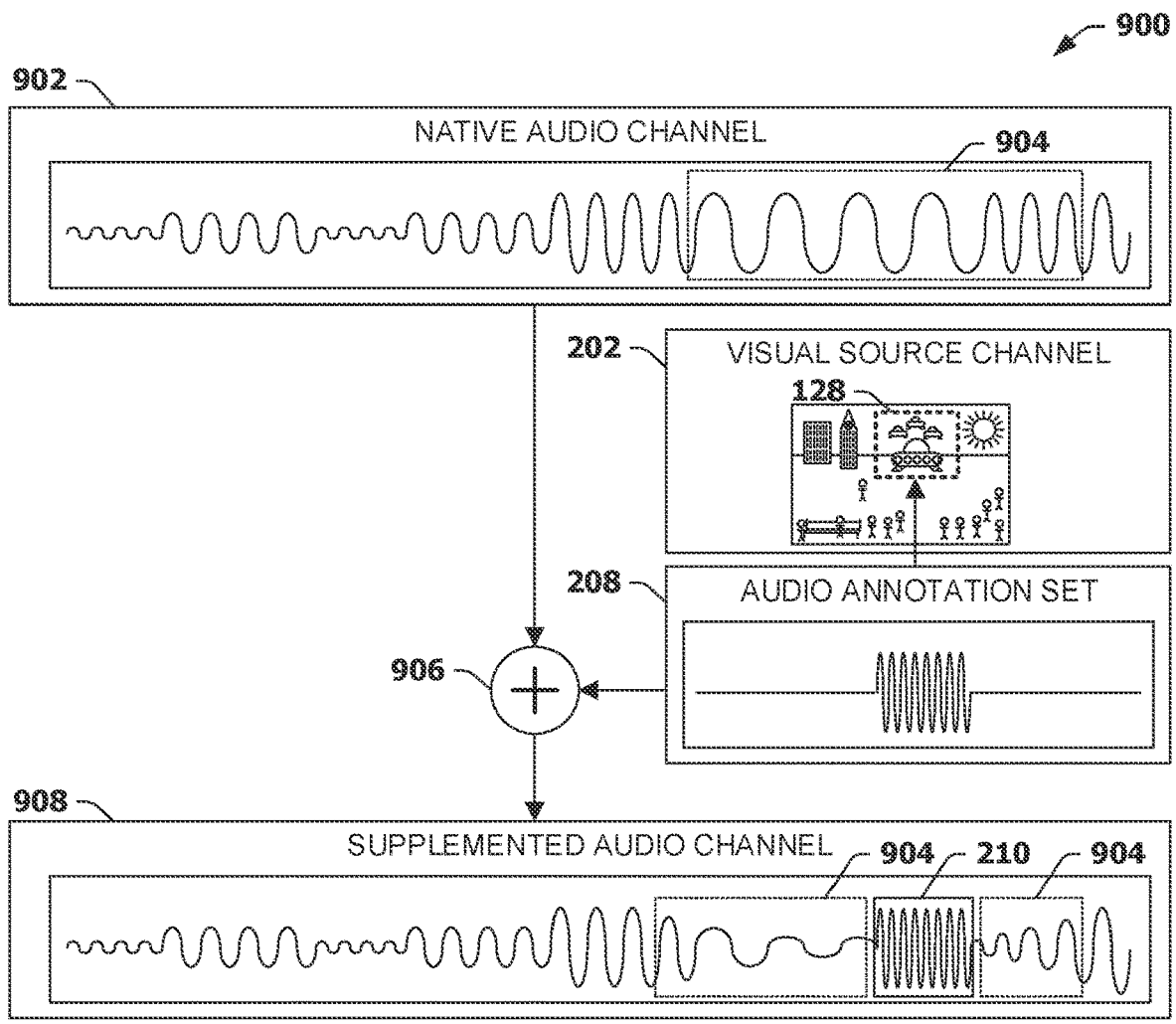
FIG. 9 is an illustration of example scenarios involving a second presentation of an extended reality presentation in accordance with the techniques presented herein.
Figure 10:
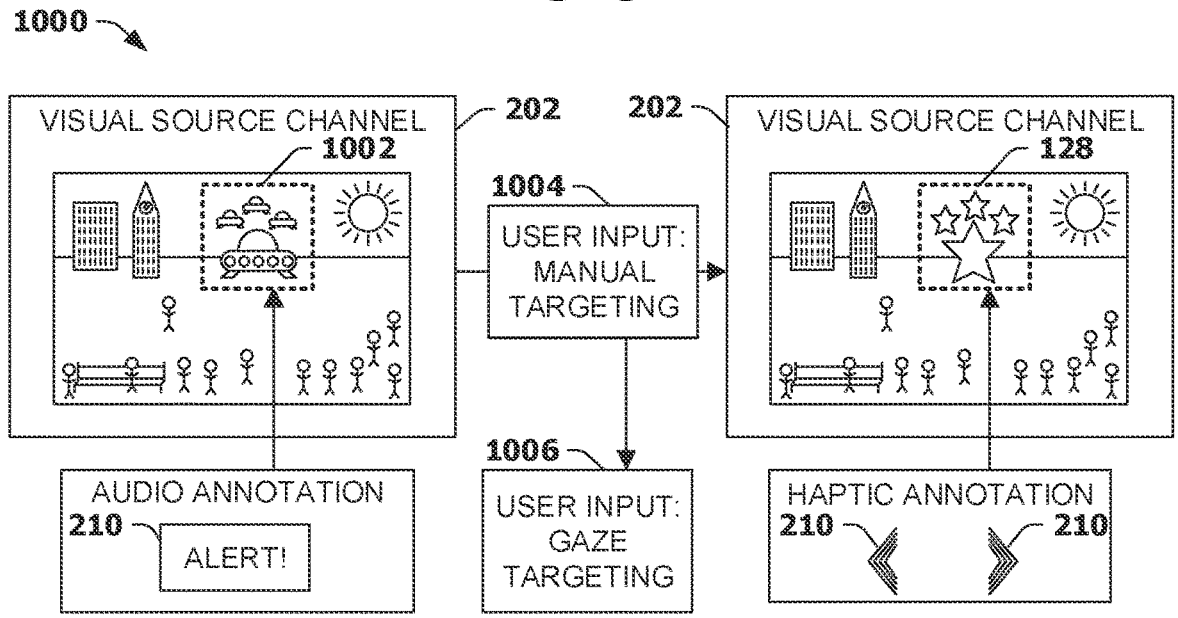
FIG. 10 is an illustration of example scenarios involving a third presentation of an extended reality presentation in accordance with the techniques presented herein.

FIGS. 8-10 present some example scenarios in which variations in the presentation of the extended reality presentation 120 are illustrated.

FIG. 8 is an illustration of a first example scenario 800 featuring a presentation of a visual source channel 202 including an event 128 that is presented in a visual modality 204. The visual source channel 202 is presented from a first-person perspective, permitting a user 106 to alter a viewing perspective 802 within the virtual environment. While the viewing perspective 802 may ordinarily permit the event 128 to be visible, the user 106 may have a visual deficit that limits his or her peripheral vision to a visual range 804, such that the event 128 occurs within a periphery 806 of the visual source channel 202 that is not visible to the user 106. In order to facilitate the user's experience of the extended reality presentation 120, an annotation 210 may be presented that provides a directional cue indicating that an event 128 is occurring in particular direction of the visual source channel 202. Additionally, the annotation 210 may be provided as a directional audio cue output 124 an audio annotation modality 206, such as a tone that is presented by a speaker 114 oriented the same direction as the direction of the event 128 within the visual source channel 202 (e.g., if the event 128 occurs in the right periphery of the user's field of view, directional audio output 124 may present a tone played from the right speaker 114 of the headset 102 while the left speaker 114 remains silent). The directionality of the directional audio output 124 may enables the user 106 to witness the event 128 and participate more fully in the extended reality presentation 120 in accordance with the techniques presented herein.

FIG. 9 is an illustration of a second example scenario 900 featuring a presentation of an annotation 210 in an annotation modality 206 of a visual source channel 202. In this example scenario 900, a visual source channel 202 is to be presented (in a supplemental manner or as a substitute) as an audio channel 112 with the events 128 of the visual source channel 202 presented as annotations 210 in an audio annotation modality 206. However, the extended reality presentation 120 already includes a native audio channel 902, such as a soundtrack for the visual source channel 202. In some embodiments, the audio annotation set 208 may be presented concurrently with the native audio channel 902, such as by presenting the native audio channel 902 through a first set of speakers and presenting the audio annotation set 208 through a second set of speakers. In other embodiments, the audio annotation set 208 may be presented instead of the native audio channel 902, but this presentation may omit some events 128 that occur in the native audio channel 902, possibly including some events 128 that occur only in the native audio channel 902. In the example scenario 900 of FIG. 9, the native audio channel 902 is blended with the audio annotation set 208 by modulating portions 904 of the native audio channel 902 during the audio annotations 210, which may permit the presentation of audio annotations 210 that are emphasized or highlighted with respect to the native audio channel 902 while reducing the loss of the native audio channel 902 in the extended reality presentation. The supplemented audio channel 908 arising from a blending 906 of the native audio channel 902, with portions 904 of the native audio channel 902 modulated in this manner; e.g., when events 128 arise in the visual source channel 202, the portions 904 of the native audio channel 902 in chronological proximity to such events 128 are reduced in volume and faded out to permit the annotations 210, presented at full volume, to be received by the user 106. In this manner, annotations 210 using audio as the annotation modality 206 and the native audio channel 902 may be presented together as part of the extended reality presentation 120 in accordance with the techniques presented herein.

FIG. 10 is an illustration of a third example scenario 1000 featuring an extended reality presentation 120 including an interaction event 1002 with which the user 106 may interact via user input 1004. The extended reality presentation 120 includes a visual source channel 202 featuring the interaction event 1002. A user 106 with a partial visual deficit 212 may generally be able to see the visual source channel 202, but may have difficulty perceiving the interaction event 1002 within a reaction period during which user input 1004 affects the extended reality presentation 120. In order to facilitate such a user 106, an annotation 210 of the interaction event 1002 may be presented in a first annotation modality 206 comprising an audio modality. A distinctive annotation 210 may be provided to distinguish the interaction event 1002 from other events 128 arising within the visual source channel 202 and/or a native audio channel 902 of the extended reality presentation 120 (e.g., a sound that cues the user 106 to provide user input 1004). Additionally, the user input 1004 may be receivable as manual targeting, such as a light gun or pointer-based controller, but the user 106 may have an additional deficit 212 that limits the mobility and/or precision of manual user input 1004. Instead, an alternative user input source 1006 may be considered as a source channel 202, such as a gaze-tracking system that tracks the gaze of the user 106, and annotations 210 may be provided in the form of manual input targeting that corresponds to gaze events 128 arising in the alternative user input source 1006. The annotations 210 may be accepted as user input 1004 that affects the extended reality presentation 120. The user input 1004 may create an additional event 128 within the extended reality presentation 120 to verify for the user 106 that the user input 1004 was received and/or successful, but the visual deficit 212 of the user 106 may also interfere with perceiving the verification event 128. Accordingly, an annotation 210 of the verification event 128 may be presented in an annotation modality 206. In this example scenario 1000, the annotation modality 206 of the annotation 210 of the verification event 128 is different not only from the source modality 204, but also from the modality of the audio annotation 210 of the interaction event 1002 (e.g., haptic output 126), thereby avoiding an overlap of the annotation 210 of the verification event 128 and the annotation 210 of the interaction event 1002 in the same modality. In this manner, the multimodal characteristics of the extended reality presentation 120 may be adaptive to the deficits 212 of the user 106, thereby promoting the accessibility of the extended reality presentation 120 for the user 106 in accordance with the techniques presented herein.

6. Computing Environment

Figure 11:
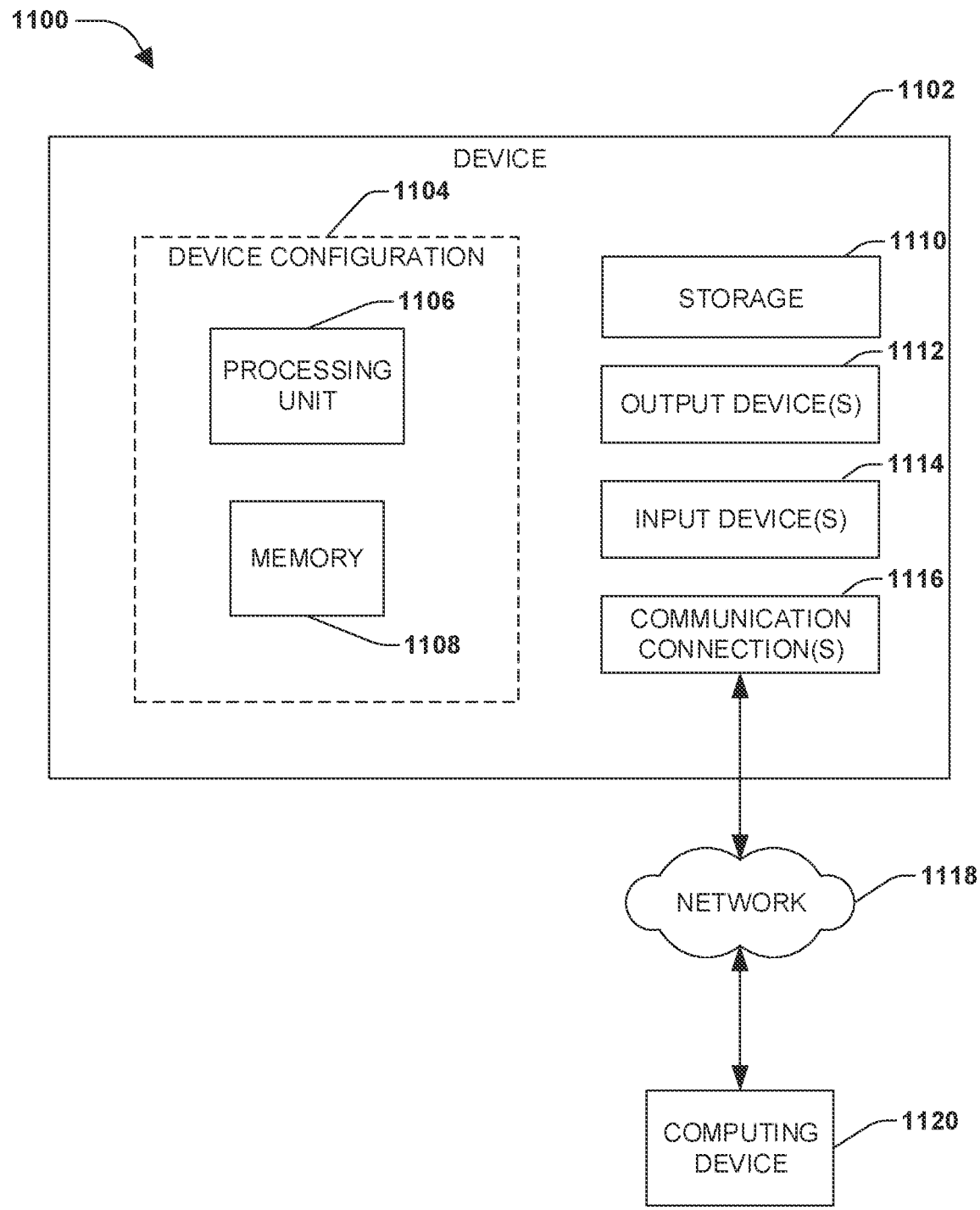
FIG. 11 is an illustration of an example scenario featuring a computing environment in which at least a portion of the techniques presented herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, cloud-based storage, and the like. Such additional storage is illustrated in FIG. 11 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 1108 for execution by processing unit 1106, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1108 and storage 910 are examples of computer storage media. Computer-storage storage devices include, but are not limited to, RAM, ROM, EEPROM, flash memory or other memory technology, CD-ROM, Digital Versatile Disks (DVDs) or other optical storage, cloud-based storage, magnetic cassettes, magnetic tape, and magnetic disk storage or other magnetic storage devices.

Device 1102 may also include communication connection(s) 916 that allows device 1102 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 1102. Input device(s) 914 and output device(s) 912 may be connected to device 1102 via a wired connection, wireless connection, or any combination thereof. In one embodiment, an input device or an output device from another computing device may be used as input device(s) 914 or output device(s) 912 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

7. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of presenting an extended reality presentation to a user, the method involving a device having a processor and comprising:
   executing, by the processor, instructions that cause the device to:
      identify a source channel of the extended reality presentation in a source modality; and
      determine that the user has a deficit in the source modality,
      wherein determining that the user has a deficit in the source modality further comprises:
         examining a second extended reality presentation that was previously presented to the user, and
         determining that the second extended reality presentation was presented to the user with a selection of an annotation modality to describe events in the source channel of the second extended reality presentation.

2. The method of claim 1, wherein determining that the user has a deficit in the source modality further comprises: examining a user profile of the user.

3. The method of claim 2, wherein determining that the user has a deficit in the source modality further comprises: identifying a notation in the user profile that indicates the deficit of the user in the source modality.

4. The method of claim 1, wherein determining that the user has a deficit in the source modality further comprises: receiving, from the user, an indication of the deficit of the user in the source modality.

5. The method of claim 1, wherein:
the extended reality presentation further comprises:
   a first annotation set of annotations in a first annotation modality that describe the events in the source channel.

6. The method of claim 5, wherein:
the extended reality presentation further comprises:
   a second annotation set of annotations in a second annotation modality that describe the events in the source channel.

7. The method of claim 6, comprising:
between the first annotation modality and the second annotation modality, selecting a selected annotation modality for the user.

8. The method of claim 7, comprising:
selecting an annotation set in the selected annotation modality for the extended reality presentation.

9. The method of claim 1, comprising:
substituting an annotation set of annotations in the annotation modality for the events in the source channel while refraining from presenting the events in the source channel.

10. The method of claim 1, wherein:
a selected event in the source channel further comprises a direction of the selected event relative to a perspective of the user in the extended reality presentation; and
the method comprises:
   for each event in the source channel, presenting a directional cue that indicates, in the annotation modality, the direction of the event relative to the perspective of the user.

11. The method of claim 1, comprising:
identifying an annotation limit of annotations to be presented in the annotation modality; and
limiting a presenting of annotations in the annotation modality to the annotation limit.

12. The method of claim 11, wherein identifying the annotation limit further comprises:
receiving, from the user, a selection of a verbosity level for the annotation modality; and
selecting the annotation limit according to the verbosity level received from the user.

13. The method of claim 1, wherein:
the extended reality presentation further comprises a native modality channel in the annotation modality; and
the method comprises:
   presenting annotations and the native modality channel in the annotation modality while emphasizing the annotations relative to the native modality channel.

14. A device that presents an extended reality presentation to a user, the device comprising:
a processor; and
a memory storing instructions that, when executed by the processor, cause the device to:
   identify, in the extended reality presentation, an annotation set of annotations in an annotation modality that describe events in a source channel; and
   while presenting the extended reality presentation to the user, present the annotations of the annotation set in the annotation modality,
   wherein:
      the extended reality presentation further comprises:
         a first annotation set of annotations in a first annotation modality that describe the events in the source channel, and
         a second annotation set of annotations in a second annotation modality that describe the events in the source channel; and
      identifying the annotation set further comprises:
         between the first annotation modality and the second annotation modality, select a selected annotation modality for the user; and
         selecting the annotation set in the selected annotation modality for the extended reality presentation.

15. A non-transitory computer-readable medium comprising instructions that when executed by a processor cause the processor to perform operations comprising:
- identifying, in an extended reality presentation, an annotation set of annotations in an annotation modality that describe events in a source channel; and
- while presenting the extended reality presentation to a user, presenting the annotations of the annotation set in the annotation modality,
- wherein presenting the annotation modality further comprises:
  - for each event in the source channel, presenting a directional cue that indicates, in the annotation modality, a direction of the event relative to a perspective of the user in the extended reality presentation.

16. A non-transitory computer-readable medium comprising instructions that when executed by a processor cause the processor to perform operations comprising:
- identifying, in an extended reality presentation, an annotation set of annotations in an annotation modality that describe events in a source channel; and
- while presenting the extended reality presentation to a user, presenting the annotations of the annotation set in the annotation modality,
- wherein presenting the annotations further comprises:
  - identifying an annotation limit of annotations to be presented in the annotation modality; and
  - limiting the presenting of annotations in the annotation modality to the annotation limit.

17. A non-transitory computer-readable medium comprising instructions that when executed by a processor cause the processor to perform operations comprising:
- identifying, in an extended reality presentation, an annotation set of annotations in an annotation modality that describe events in a source channel; and
- while presenting the extended reality presentation to a user, presenting the annotations of the annotation set in the annotation modality,
- wherein presenting the annotations further comprises:
  - identifying a user context of the user within the extended reality presentation;
  - among the events in the source channel, identifying an event subset of events in the source channel that relate to the user context; and
  - limiting the presenting of annotations in the annotation modality to presenting the annotations of the event subset.

18. A non-transitory computer-readable medium comprising instructions that when executed by a processor cause the processor to perform operations comprising:
- identifying, in an extended reality presentation, an annotation set of annotations in an annotation modality that describe events in a source channel; and
- while presenting the extended reality presentation to a user, presenting the annotations of the annotation set in the annotation modality,
- wherein presenting the annotations further comprises:
  - detecting an event selection by the user of a selected event; and
  - responsive to the event selection, presenting an annotation of the selected event in the annotation modality.

19. A non-transitory computer-readable medium comprising instructions that when executed by a processor cause the processor to perform operations comprising:
- identifying, in an extended reality presentation, an annotation set of annotations in an annotation modality that describe events in a source channel; and
- while presenting the extended reality presentation to a user, presenting the annotations of the annotation set in the annotation modality,
- wherein presenting the annotations further comprises:
  - presenting, in the annotation modality, an interaction annotation that indicates that an interaction event, in the events in the source channel, permits user interaction within the extended reality presentation.

20. The non-transitory computer-readable medium of claim 19, wherein:
- the extended reality presentation further comprises a native modality channel in the annotation modality; and
- the operations comprise:
  - presenting annotations and the native modality channel in the annotation modality while emphasizing the annotations relative to the native modality channel.

* * * * *